United States Patent
Haine et al.

(10) Patent No.: US 11,907,417 B2
(45) Date of Patent: Feb. 20, 2024

(54) GLANCE AND REVEAL WITHIN A VIRTUAL ENVIRONMENT

(71) Applicant: Tectus Corporation, Saratoga, CA (US)

(72) Inventors: Dominic Philip Haine, Saratoga, CA (US); Scott Herz, Saratoga, CA (US)

(73) Assignee: Tectus Corporation, Saratoga, CA (US)

( * ) Notice: Subject to any disclaimer, the term of this patent is extended or adjusted under 35 U.S.C. 154(b) by 761 days.

(21) Appl. No.: 16/522,608

(22) Filed: Jul. 25, 2019

(65) Prior Publication Data

US 2021/0026444 A1 Jan. 28, 2021

(51) Int. Cl.
*G06F 3/01* (2006.01)
*G06F 3/04815* (2022.01)
*G02B 27/01* (2006.01)
*G06V 40/18* (2022.01)

(52) U.S. Cl.
CPC ......... *G06F 3/013* (2013.01); *G02B 27/0101* (2013.01); *G06F 3/04815* (2013.01); *G06V 40/18* (2022.01); *G02B 2027/0187* (2013.01)

(58) Field of Classification Search
CPC ............ G02B 27/0093; G02B 27/0101; G02B 27/017; G02B 2027/0187; G02C 7/04; G02C 11/10; G06F 3/011; G06F 3/012; G06F 3/013; G06F 3/04815; G06F 3/0482; G06V 20/20; G06V 40/18; G06V 40/19; G06V 40/193; G06V 40/20
See application file for complete search history.

(56) References Cited

U.S. PATENT DOCUMENTS

| | | |
|---|---|---|
| 5,844,544 A | 12/1998 | Kahn |
| 8,430,310 B1 | 4/2013 | Ho |
| 8,520,309 B2 | 8/2013 | Sprague |
| 8,764,185 B1 | 7/2014 | Biederman |
| 8,786,675 B2 | 7/2014 | Deering |
| 8,798,332 B2 | 8/2014 | Otis |
| 8,827,445 B1 | 9/2014 | Wiser |
| 8,870,370 B1 | 10/2014 | Otis |
| 8,874,182 B2 | 10/2014 | Etzkorn |

(Continued)

FOREIGN PATENT DOCUMENTS

WO 2018109570 6/2018

OTHER PUBLICATIONS

International Search Report and Written Opinion in PCT/US2020/056376, dated Jan. 12, 2021, 10 pages.

*Primary Examiner* — Nelson M Rosario
(74) *Attorney, Agent, or Firm* — North Weber & Baugh LLP; Michael North

(57) ABSTRACT

Described herein are eye-controlled user-machine interaction systems and methods that, based on input variables that comprise orientation and motion of an eye-mounted display (EMD), assist the wearer of a contact lens carrying the EMD to control and navigate a virtual scene that may be superimposed onto the real-world environment. Various embodiments of the invention provide for smooth, intuitive, and naturally flowing eye-controlled, interactive operations between the wearer and a virtual environment. In certain embodiments, this is accomplished by revealing layers of virtual objects and content based on eye-tracking and other motion information.

29 Claims, 16 Drawing Sheets

(56) References Cited

U.S. PATENT DOCUMENTS

| | | |
|---|---|---|
| 8,960,898 B1 | 2/2015 | Etzkorn |
| 8,964,298 B2 | 2/2015 | Haddick |
| 8,971,978 B2 | 3/2015 | Ho |
| 8,989,834 B2 | 3/2015 | Ho |
| 9,028,068 B2 | 5/2015 | Chang |
| 9,047,512 B2 | 6/2015 | Otis |
| 9,052,533 B2 | 6/2015 | Pugh |
| 9,153,074 B2 | 10/2015 | Zhou |
| 9,170,646 B2 | 10/2015 | Toner |
| 9,196,094 B2 | 11/2015 | Ur |
| 9,215,293 B2 | 12/2015 | Miller |
| 9,298,002 B2 | 3/2016 | Border |
| 9,298,020 B1 | 3/2016 | Etzkorn |
| 9,341,843 B2 | 5/2016 | Border |
| 10,345,621 B2 | 7/2019 | Franklin |
| 10,353,463 B2 | 7/2019 | Shtukater |
| 2004/0155907 A1* | 8/2004 | Yamaguchi ........... G06F 3/0481 715/810 |
| 2009/0066722 A1 | 3/2009 | Kriger |
| 2011/0221659 A1 | 9/2011 | King, III |
| 2014/0063054 A1 | 3/2014 | Osterhout |
| 2014/0098226 A1 | 4/2014 | Pletcher |
| 2014/0198128 A1 | 7/2014 | Hong |
| 2014/0347265 A1 | 11/2014 | Aimone |
| 2015/0192992 A1* | 7/2015 | Di Censo ............... G06F 3/013 345/156 |
| 2015/0205106 A1* | 7/2015 | Norden ................ G02B 27/017 345/7 |
| 2015/0235439 A1 | 8/2015 | Schowengerdt |
| 2015/0235440 A1 | 8/2015 | Schowengerdt |
| 2015/0235444 A1 | 8/2015 | Schowengerdt |
| 2015/0235446 A1 | 8/2015 | Schowengerdt |
| 2015/0235457 A1 | 8/2015 | Schowengerdt |
| 2015/0235468 A1 | 8/2015 | Schowengerdt |
| 2015/0235471 A1 | 8/2015 | Schowengerdt |
| 2015/0241698 A1 | 8/2015 | Schowengerdt |
| 2015/0243090 A1 | 8/2015 | Schowengerdt |
| 2015/0338915 A1 | 11/2015 | Publicover |
| 2015/0339857 A1 | 11/2015 | O'Connor |
| 2015/0362753 A1 | 12/2015 | Pletcher |
| 2016/0011419 A1 | 1/2016 | Gao |
| 2016/0018650 A1 | 1/2016 | Haddick |
| 2016/0018651 A1 | 1/2016 | Haddick |
| 2016/0018652 A1 | 1/2016 | Haddick |
| 2016/0018653 A1 | 1/2016 | Haddick |
| 2016/0025981 A1* | 1/2016 | Burns ................ G02B 27/0101 345/156 |
| 2016/0091737 A1 | 3/2016 | Kim |
| 2016/0133201 A1 | 5/2016 | Border |
| 2016/0253831 A1 | 9/2016 | Schwarz |
| 2016/0274660 A1 | 9/2016 | Publicover |
| 2016/0283595 A1 | 9/2016 | Folkens |
| 2017/0019661 A1 | 1/2017 | Deering |
| 2017/0023793 A1* | 1/2017 | Shtukater ............. G02B 27/017 |
| 2017/0115742 A1 | 4/2017 | Xing |
| 2017/0123492 A1* | 5/2017 | Marggraff .............. H04N 5/247 |
| 2017/0177078 A1 | 6/2017 | Henderek |
| 2017/0270636 A1 | 9/2017 | Shtukater |
| 2017/0371184 A1 | 12/2017 | Shtukater |
| 2018/0120568 A1 | 5/2018 | Miller |
| 2018/0149884 A1* | 5/2018 | Miller ................. G02B 27/017 |
| 2018/0335835 A1 | 11/2018 | Lemoff |
| 2018/0348969 A1* | 12/2018 | Kawamura ......... G06F 3/04812 |
| 2019/0056785 A1 | 2/2019 | Suk |
| 2019/0235624 A1* | 8/2019 | Goldberg ................ G06F 1/163 |
| 2019/0250408 A1 | 8/2019 | Lafon |
| 2019/0250432 A1 | 8/2019 | Kim |
| 2019/0377428 A1 | 12/2019 | Mirjalili |

\* cited by examiner

GLANCE AND REVEAL WITHIN A VIRTUAL ENVIRONMENT

TECHNICAL FIELD

The present disclosure relates generally to eye-controlled user-machine interaction systems and methods that provide a framework in which user-selectable objects are generated, organized, and displayed within an augmented reality (AR) and virtual reality (VR) environment having a limited viewable area in which an individual can interact with these objects.

BACKGROUND

The growth of AR/VR technologies across a large and diverse set of markets is well understood by one of skill in the art. Markets such as gaming, media, search, and information management implement a variety of different AR/VR products to allow an individual to interact with a virtual environment. These AR/VR products provide an individual a rich and dynamic platform in which the user can retrieve information, view media content, navigate virtual scenes and interact with other individuals in a manner unique to the AR/VR environment. It is important that these AR/VR products maintain a user-friendly experience throughout their use and avoid overloading a user with too much content and information, while concurrently managing the way in which the user interacts with the virtual environment; a task that is oftentimes difficult given the constraints of today's AR/VR products.

While AR/VR technologies offer users the ability to uniquely interact with virtual content in a virtual medium and enjoy an immersive user experience, these technologies are not without limitations. These technologies are oftentimes constrained by the way an individual can interact with the virtual environment. For example, many AR/VR products rely on hand-gestures, hand controllers, or other types of movement that must be translated into the virtual environment itself. These interactive movements are potentially obtrusive, hard to learn, tiring over time, inconvenient to use, and not available to those without facile motion of their arms or hands. Further, such movements may appear awkward in a social context, thus, negatively impacting the overall virtual experience. Furthermore, some virtual environments, such as for AR glasses, are oftentimes area-limited in that the viewable area within the virtual environment is significantly constrained to only a portion of the user's field of view. This limited viewable area may significantly limit a product's ability to provide an individual a diverse set of content, information, and options within this visible area of a virtual scene.

Accordingly, what is needed is systems and methods that efficiently manage user interaction and content within a AR/VR environment to improve the user experience.

DETAILED DESCRIPTION OF EMBODIMENTS

The figures and the following description relate to various embodiments by way of illustration. It is noted that from the following discussion, alternative embodiments of the structures and methods disclosed herein will be readily recognized as viable. It is further noted that any headings used herein are only for organizational purposes and shall not be used to limit the scope of the description or the claims. All documents cited are incorporated by reference herein in their entirety.

A. Eye Mounted Display System

Figure 1:
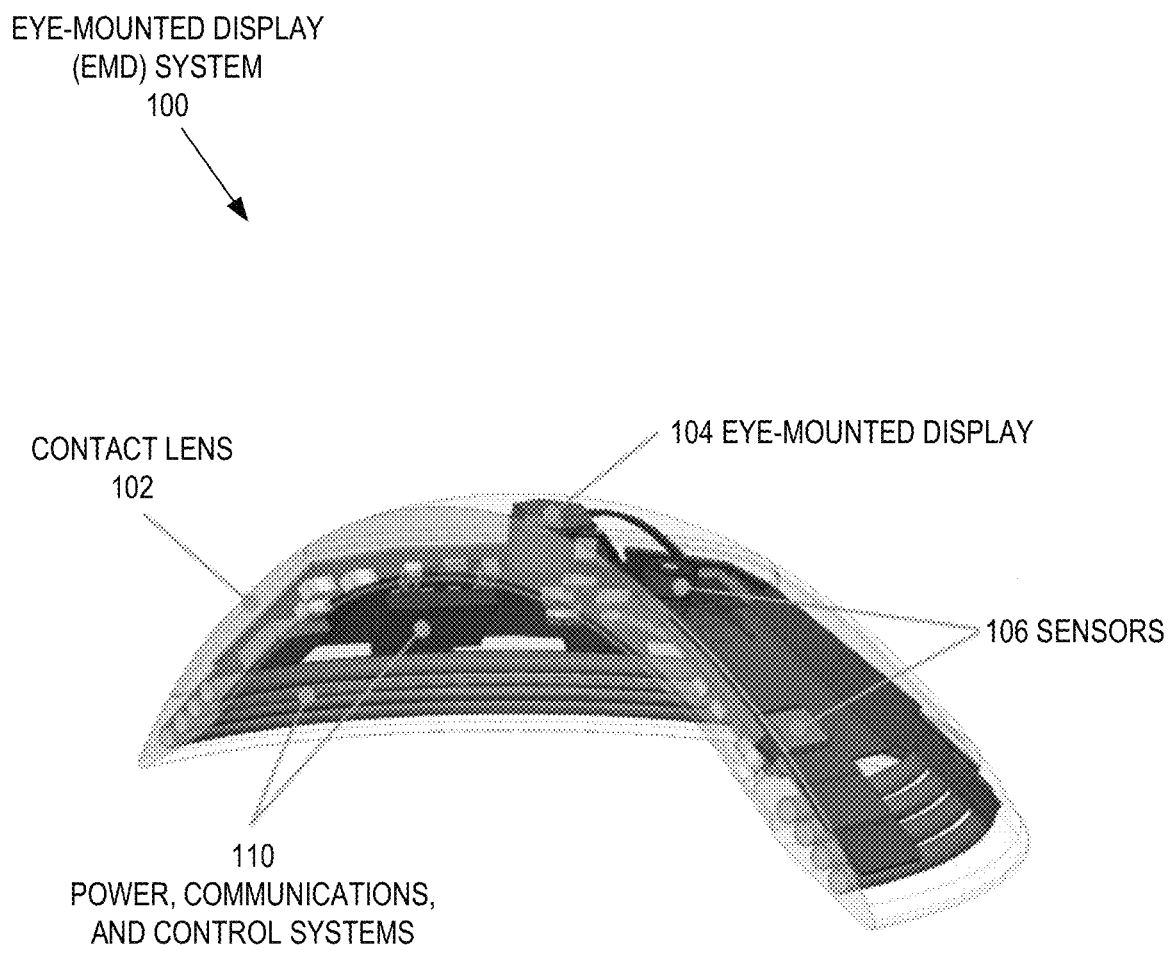
FIG. 1 illustrates an exemplary eye-mounted display (EMD) system according to embodiments of the present disclosure.

FIG. 1 illustrates an exemplary eye-mounted display (EMD) system according to embodiments of the present disclosure. The EMD system 100 allows a user to interact with a virtual environment such that eye movement is translated into a visible virtual scene within a larger virtual environment. The EMD system 100 may comprise a contact lens 102, such as a scleral contact lens designed to be fixed on the wearer's eyeball. Embedded on the contact lens 102 may be eye-mounted display 104, sensors 106, and power, communications, and control systems 110. EMD 104 may be implemented as a miniature video projector that projects images on the part of the wearer's retina centered on the fovea—the highly sensitive, i.e., high-resolution region of the retina that is referred to when the eye directly gazes or inspects an object. Sensors 106 may comprise any type of motion sensors, such as accelerometers, magnetometers, and gyroscopes, and image sensors (such as a camera) that may be used for eye-tracking functionality.

The power, communications, and control systems 110 comprise coils that enable inductive power transfer, or an energy storage device, such as an on-chip battery, that can deliver sufficient energy to operate EMD system 100 for a period of time. Various EMD systems may also include transceivers for communication with internal and/or external devices, and various controllers that control circuits and sub-circuits.

The user of an eye-controlled EMD system 100 may use any combination of eye movements and other signals to interact with a virtual scene within a virtual environment. This interaction may be supplemented with various auxiliary devices such a wearable head-mounted eye-tracking device, a smartphone, a hand-held controller, other body sensors, electronic jewelry or any other type of device that can communicate with the EMD system.

It is noted that certain tasks performed by EMD system 100 may equally be performed, for example, by an auxiliary device (not shown in FIG. 1) that may be communicatively coupled with EMD system 100 and, in embodiments, provides power via inductive coupling. Exemplary accessory devices, EMDs, and their functions and components are described in greater detail in U.S. patent application Ser. No. 15/959,169, filed on Apr. 21, 2018, entitled "Power Generation Necklaces that Mitigate Energy Absorption in the Human Body," listing inventors Miller et al.; U.S. patent application Ser. No. 15/966,481, filed on Apr. 30, 2018, entitled "Multi-Coil Field Generation In An Electronic Contact Lens System," listing inventors Owens et al.; U.S. patent application Ser. No. 15/966,475, filed on Apr. 30, 2018, entitled "Multi-Coil Field Generation In An Electronic Contact Lens System," listing inventors Owens et al.; U.S. patent application Ser. No. 15/984,182, filed on May 18, 2018, entitled "Power Generation Necklaces that Reduce Energy Absorption in the Human Body," listing inventors Owens et al.; U.S. patent application Ser. No. 16/035,640, filed on Jul. 15, 2018, entitled "Eye-mounted Displays Including Embedded Conductive Coils," listing inventors Mirjalili et al.; and U.S. patent application Ser. No. 16/227, 139, filed on Dec. 20, 2018, entitled "Eye-Mounted Display System Including A Head Wearable Object," listing inventors Pang et al., which patent documents are incorporated by reference herein in their entirety and for all purposes.

In embodiments, the auxiliary device may comprise circuitry to communicate via an electronic communication protocol, (e.g., an encryption protocol that facilities the exchange of credentials during an authorization process) with contact lens 102 and directly or indirectly (e.g., via the user's phone) with an external network (e.g., Internet). The auxiliary device may perform various computationally intensive tasks in lieu of EMD system 100, such as computing some or all of the display data for EMD 104 as well as translation of user movements into the virtual environment. In addition, the accessory device may serve as an intermediate data storage tool that increases the storage capacity of EMD system 100.

In embodiments, EMD system 100 and/or the auxiliary device manages how, where, and when a virtual object in a virtual scene is displayed within a given coordinate space. The EMD system and/or auxiliary device may update the content and layout of a virtual scene including the graphical representation of objects on the display according to user's eye-movement. As will be explained in detail below, this content update allows the user to scan a virtual scene by effectively updating a projected image correlated to where the user is looking within the scene itself.

In embodiments, eye-movements may be tracked, estimated (e.g., using a Kalman filter algorithm) and/or predicted based on motion, image, sensor data or a combination thereof. Data derived from such eye movements may include timing and sequences of saccadic movements, eye direction (e.g., eye angle, elevation, roll, yaw), the fixation point in space, orientation of head/body, and body position data. This data may also take into account wearer-specific conditions, such as physical and biological characteristics, that relate to the user's range of eye-motion, eye muscle irregularities, and other limiting factors and context that may vary over time.

B. Sensors

Figure 2A:
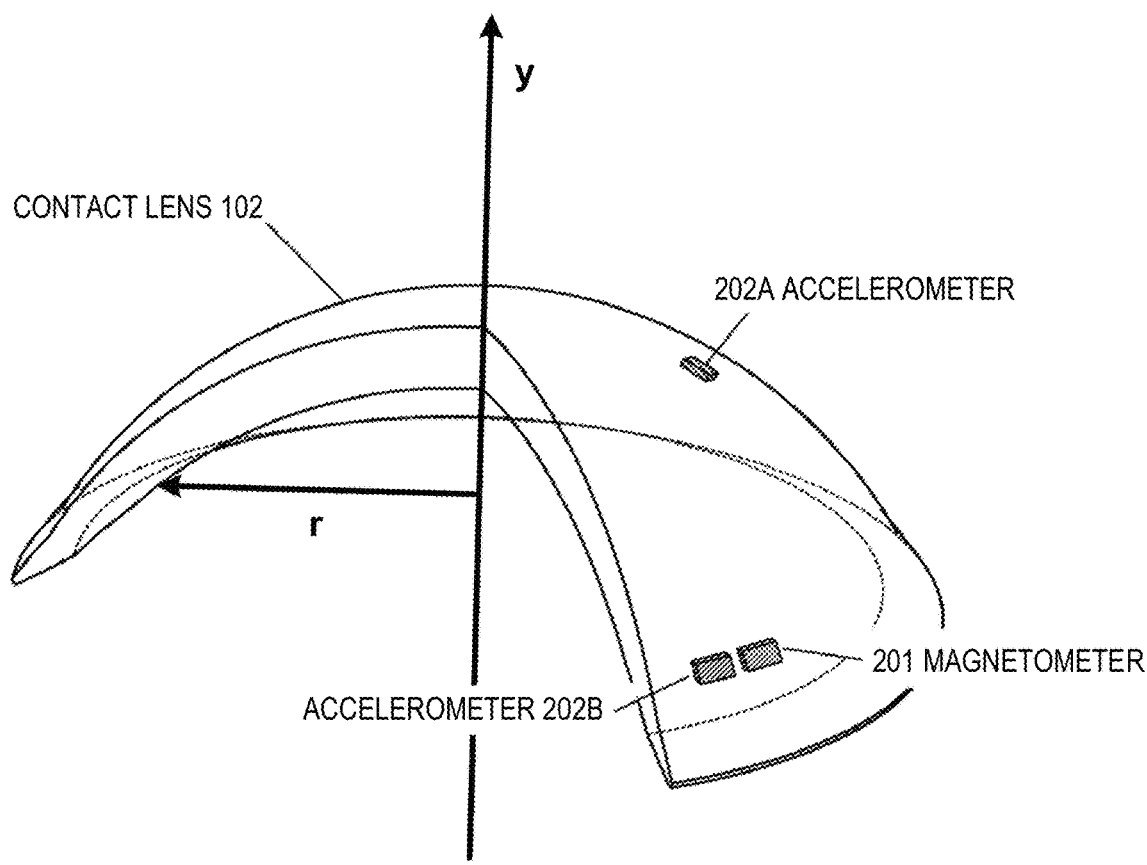
FIG. 2A illustrates an exemplary contact lens for an EMD system comprising motion sensors according to embodiments of the present disclosure.

FIG. 2A illustrates an exemplary contact lens for an EMD system comprising motion sensors according to embodiments of the present disclosure. As depicted in FIG. 2A, contact lens 102 may be constructed in the shape of a traditional scleral contact lens. Contact lens 102 comprises magnetometer 201 and accelerometers 202A and 202B that may be embedded within contact lens 102. It is understood that any number and type of sensors may be used to perform the tasks related to the objectives of the present disclosure. Suitable sensors may be used to sense eye movements to determine distance, speed, acceleration, orientation, path, angle, rate, etc. Various types of sensors and their strategic locations on contact lens 102 are described in more detail in in U.S. patent application Ser. No. 16/005,379, filed on Jun. 11, 2018, entitled "Contact lens gaze tracking architectures," listing inventors Mirjalili et al. and U.S. patent application Ser. No. 16/200,039, filed on Nov. 26, 2018, entitled "Eye-mounted Displays Including Embedded Solenoids," listing inventors Mirjalili et al., which patent documents are incorporated by reference herein in their entirety and for all purposes.

In embodiments, magnetometer 201 and accelerometers 202A, 202B may be used as motion sensors to detect and track the orientation of contact lens 102 and, thus, the orientation of the eye of the user. In other embodiments, a gyroscope or outward-facing image sensor may be deployed within the contact lens 102 to replace or supplement the sensors described above. Other sensors located on the body or head may also be involved.

In embodiments, raw sensor data from sensors 201, 202 may be translated into control signals that uses information related to eye movement. This eye movement tracking identifies an initial orientation of the eye in order to track or predict a target or intermediate location therefrom. The detected or predicted eye movements, in turn, may be used to control, activate, deactivate, navigate, or select virtual objects in a virtual scene. This type of interaction between a user and a virtual scene allows for a smooth, intuitive, and effortless manner in which a user can navigate a scene and extract information therefrom.

C. Reference Frames

Figure 2B:
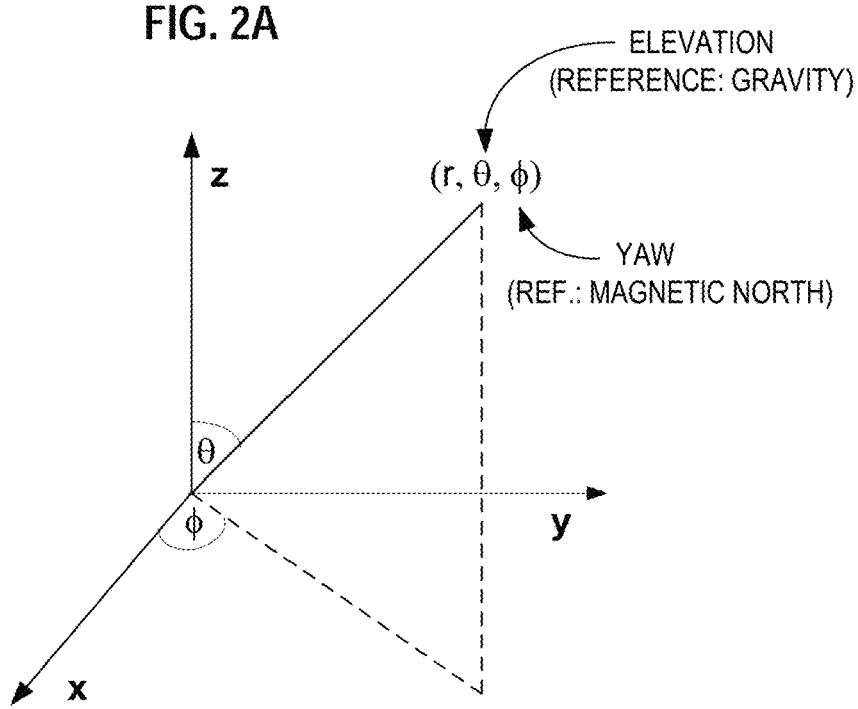
FIG. 2B shows a polar coordinate system that serves as reference frame for components in the EMD system shown in FIG. 1.

FIG. 2B shows a spherical coordinate system that may serve as a reference frame for components in the EMD system shown in FIG. 1. According to the convention presented in FIG. 2B, the reference for an elevation sensor, such as an accelerometer, may be the polar angle θ that is directed along the earth's gravitational field. The reference for a yaw sensor, such as a magnetometer, may be the magnetic north pole and may be tracked using an azimuthal angle ϕ. It is understood that a reference frame may be defined in any arbitrary convention, including a two-dimensional polar coordinate system, a cylindrical coordinate system, or any other system known in the art.

Figure 2C:
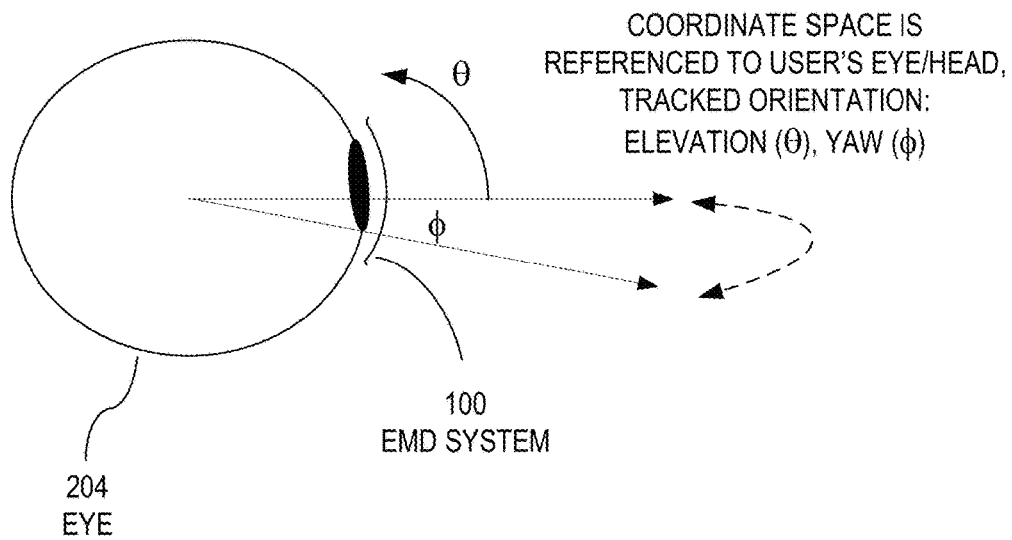
FIG. 2C and FIG. 2D illustrate various conventions for reference frames for the EMD system shown in FIG. 1.
Figure 2D:
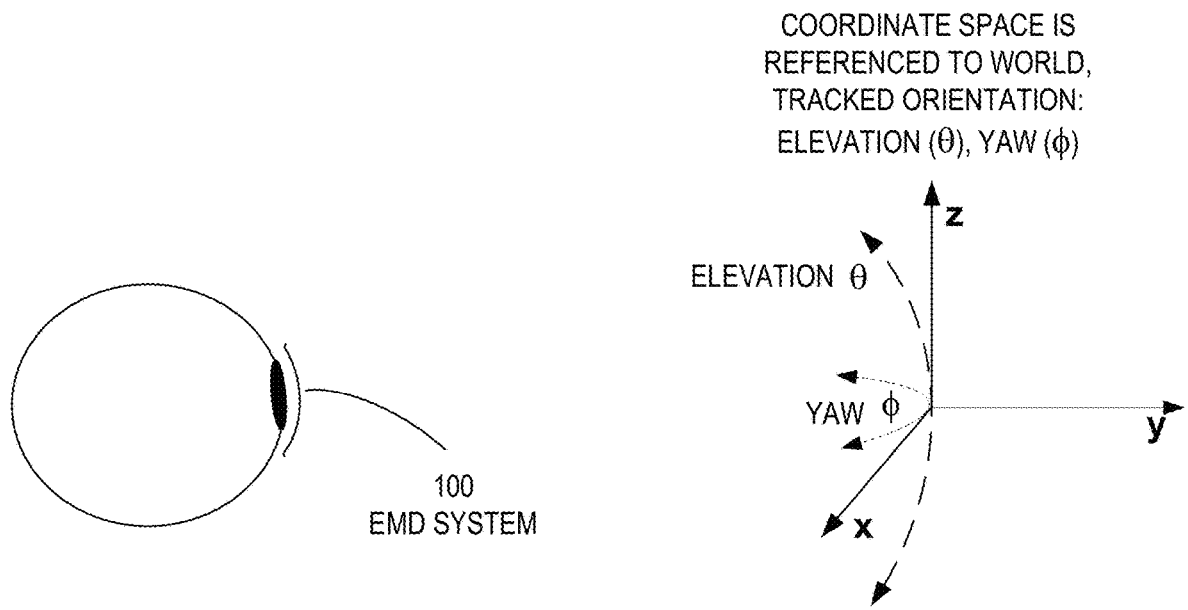

FIG. 2C and FIG. 2D illustrate various conventions for reference frames for the EMD system shown in FIG. 1. FIG. 2C refers to the coordinate space of the user's eye 204 or head to enable eye-tracking or head-tracking by tracking polar angle θ (i.e., up/down elevation) and azimuthal angle (I) (i.e., left/right rotation). FIG. 2D refers to the coordinate space of the user's environment to enable "world-tracking," by tracking angles θ and (I), representing elevation and yaw, respectively. In a world-tracked system, objects in the virtual environment appear locked at locations in the user's environment, irrespective of how the user moves his/her eyes, head or body.

In embodiments, mathematical transformations may be utilized to facilitate transitions between reference frames, coordinates, and parameters to enable smooth transitions at suitable rates when a user visually navigates and interacts with virtual objects in the coordinate space of a virtual scene. A transition may involve switching from a reference frame to which the user's eyes or head are fixed to one where it is the user's body that is fixed. For example, a first frame of reference, e.g., for the user's head, may be derived from a second frame of reference for the user's eyes by taking into account the orientation of the user's eyes and the manner in which the user's head follows the user's eyes. In addition, a transition may involve transitioning between various reference frames that are associated with different objects in a virtual scene, e.g., objects that are fixed to different reference frames.

D. Concept of Span of Eccentricity

Figure 3:
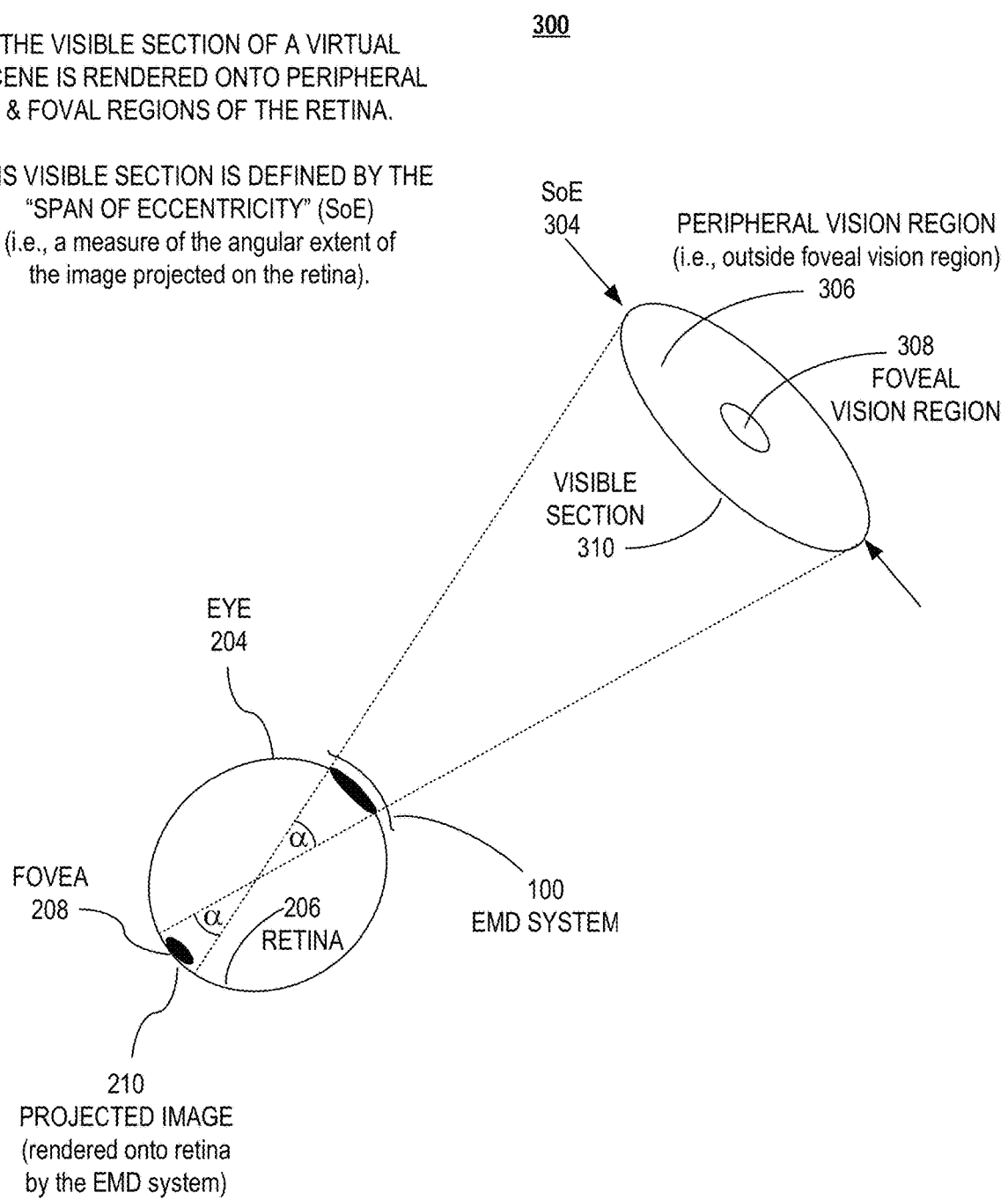
FIG. 3 illustrates the concept of Span of Eccentricity (SoE) according to embodiments of the present disclosure.

FIG. 3 illustrates the concept of Span of Eccentricity (hereinafter, "SoE") according to embodiments of the present disclosure. In this document, the term "projected" is used interchangeably with the terms "displayed." Similarly, the term "user" is used interchangeably with the term "wearer." "Span of Eccentricity" refers to the apparent angular width of the image 210 on the line of gaze, extending into the peripheral vision. As depicted in FIG. 3, projected the image 210 is the visible section of a virtual scene, such as that depicted in FIG. 4B. In embodiments, looking outward from eye 204, the image 210 that is projected onto retina 206 by EMD 100 appears to have an angular width in the outside world equal to that of the SoE 304.

In embodiments, because EMD system 100 is fixed on eyeball 204, the image 210 projected by EMD 100 is ordinarily fixed (i.e., locked) to and moves together with eyeball 204. As a result, the wearer sees projected image 210 displayed on retina 206 irrespective of where wearer of EMD 100 directs his/her eye 204 (or any other body parts). In fact, the wearer of EMD 100 cannot even look at or fixate eye 204 anywhere other than about the center of SoE 304; specifically, the foveal vision region 308 (the fovea extends from zero to about 1.5° eccentricity about 3° within the SoE). Thus, irrespective of where eye 204 moves, the wearer cannot look at or inspect objects or images appearing outside of foveal vision region 308 at the edges of SoE 304 as those images remain only in the wearer's peripheral vision region 306. Stated differently, while the wearer of EMD 100 may recognize that a virtual object is present at the edge of projected image 210, without additional capability, the wearer is unable to direct his/her gaze there. Because eye movements alone do not change the content and location of what is projected on the wearer's retina 206, the attempt is rendered futile.

A person of skilled in the art will appreciate that the concept of SoE is markedly different from, and not to be confused with, the concept of "field of view" as used in connection with conventional displays, such as computer monitors, TVs, or displays on eyeglasses (i.e., the angular separation between the edges of a display). For instance, if a user has to move his/her eyes by an angle of 50 degrees from one edge of a conventional display to the opposite edge, the field of view is said to be 50 degrees wide.

In contrast to a traditional display, a canvas that has a fixed width and height that define the user's field of view, the entire world around the user's head/eyes is the virtual canvas even if the image displayed on retina 206, and seen at any moment in time when eye 204 does not move, corresponds to the portion of the canvas that is covered by SoE 304. The virtual canvas is practically unlimited in that moving SoE 304, i.e., the visible portion, allows the user to view a virtual scene in all directions, i.e., 360 degrees around the user, with no boundaries and without a "field of view" limitation. Similarly, in an AR system, the visible area is the same as the field of view of the display area. Despite the limited field of view, a user can look around a larger virtual scene in an AR system by turning the head.

As discussed in greater detail below, to enable direct inspection of objects in a virtual scene with highly sensitive fovea 208 that are located outside of foveal region 308 or outside SoE 304, the projected image 210 is updated to appear to move SoE 304 to the new location within the virtual scene. The updated image is correlated to the movement of the eye 204 and EMD 100 to render the appropriate segment of the virtual scene to the user. For example, if a movement of eye 204 in one direction occurs, the projected image 210 may be updated in an opposite direction such as to give the user a perception of scanning the virtual scene.

Overall, unlike for conventional displays, such as monitors, phone screens, AR glasses/goggles, or other types of displays in the pertinent art, the wearer of a contact lens comprising EMD 100 does not perceive images generated by the image projector and displayed within SoE 304 as being in a "field of view."

Figure 4A:
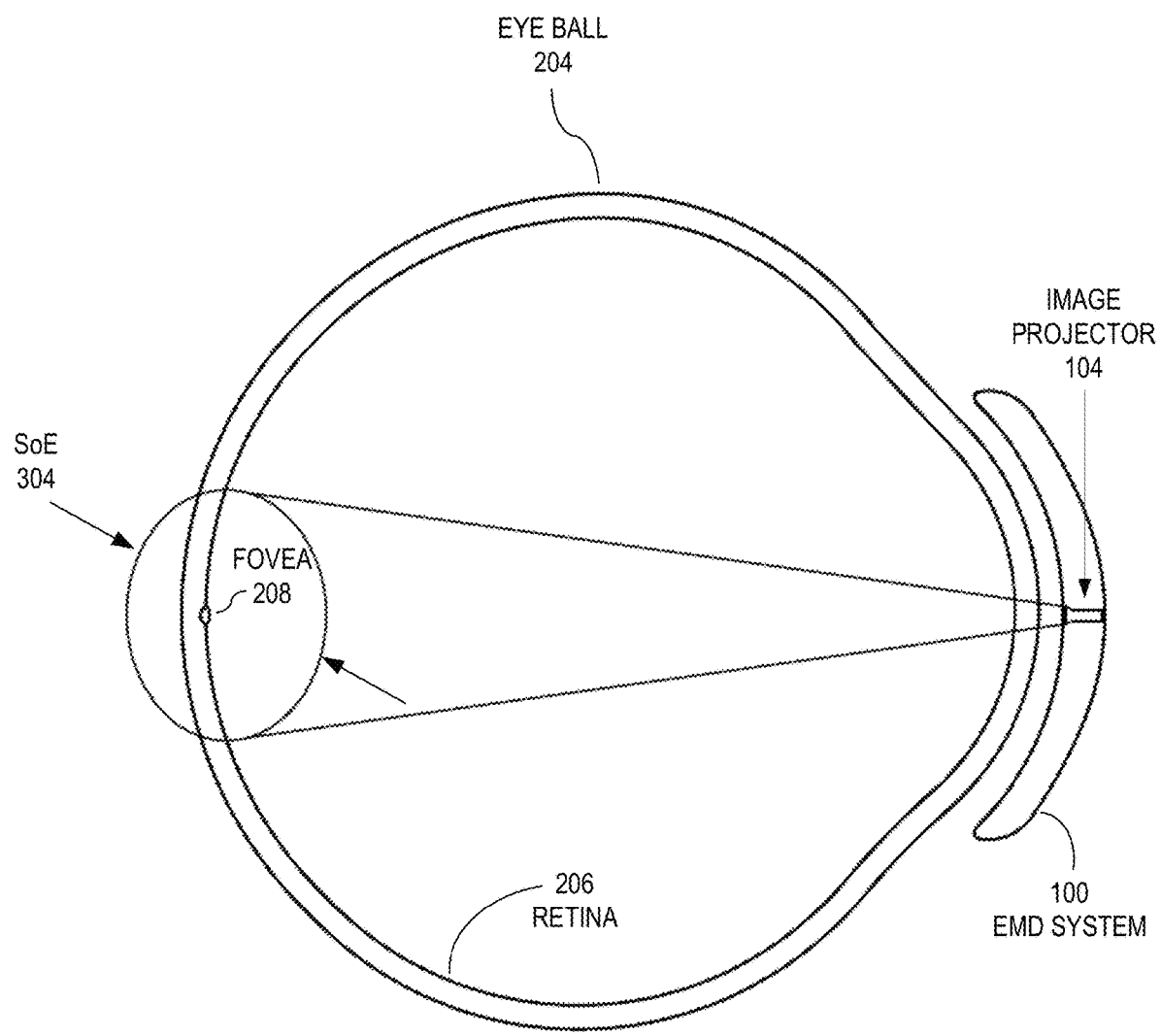
FIG. 4A illustrates projecting onto the retina the visible portion of a virtual image according to embodiments of the present disclosure.

FIG. 4A illustrates projecting onto the retina the visible portion of a virtual image according to embodiments of the present disclosure. EMD system 100 comprises eye-mounted display 104 that may be embedded with a contact lens. In embodiments, eye-mounted display 104 may be implemented as a miniature video projector (hereinafter "femtoprojector") that comprises an image source (e.g., a micro-display frontplane comprising a light emitting diode array and a CMOS backplane) and a micro-optical projection system that projects an image generated by the image source directly onto retina 206 to cause the image to appear in the user's field of vision. An eye-mounted display has been proposed by Deering. See, e.g. U.S. Pat. No. 8,786,675, "Systems using eye mounted displays." One type of eye-mounted display is based on a tiny projector mounted inside a contact lens. The projector projects images onto the retina of a person wearing the contact lens. The projector must be sufficiently small (e.g., a 2 mm by 2 mm by 2 mm by cubic volume) to fit inside or on a contact lens that can be worn on a person's eyeball, such that, for convenience, Deering called it a "femtoprojector." A typical femtoprojector preferably is no larger than about one or two millimeters in any dimension. In embodiments, the femtoprojector's optical system may be implemented using a cylindrical, solid plastic, dual-mirror design. While being constrained to the physical dimensions of a contact lens, the optical system should provide appropriate magnification and sufficient image quality.

It is understood that one or more EMDs 104 may be used, for example, one EMD 104 that projects an image directly onto fovea 208, which contains the highest number of retinal receptive fields, i.e., generating the highest resolution images on retina 206. And a different, lower resolution EMD 104 may be used to project images mainly onto the "lower-resolution" peripheral region of retina 206 that cannot resolve the higher resolution images.

It is noted that EMD system 100 may be used in VR applications, AR applications, mixed reality applications, and the like. In virtual reality applications, the image projected by EMD system 100 replaces what the user would normally see in the external environment, whereas in AR and mixed reality applications, the projected images appear superimposed onto the external environment, such that the projected image augments or adds to what the user sees in the real world.

E. Flashlight Comparison

Figure 4B:
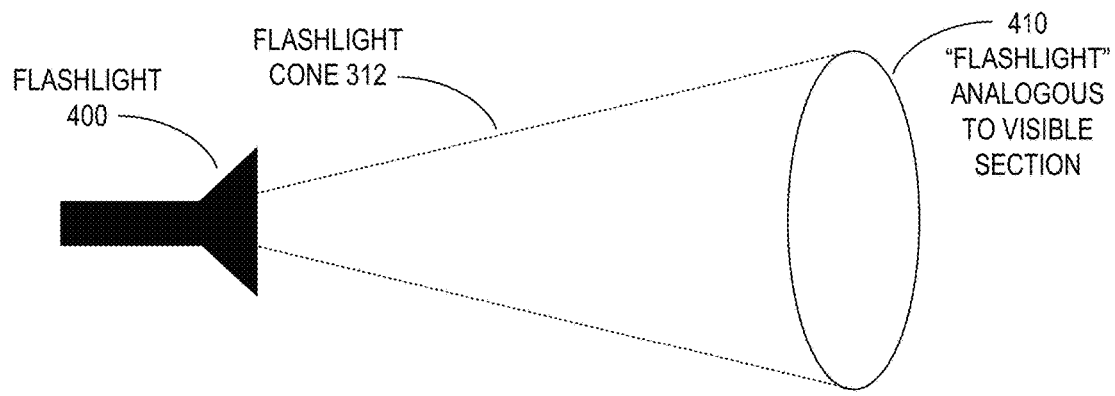
FIG. 4B and FIG. 4C illustrate the concept of SoE using a flashlight analogy.
Figure 4C:
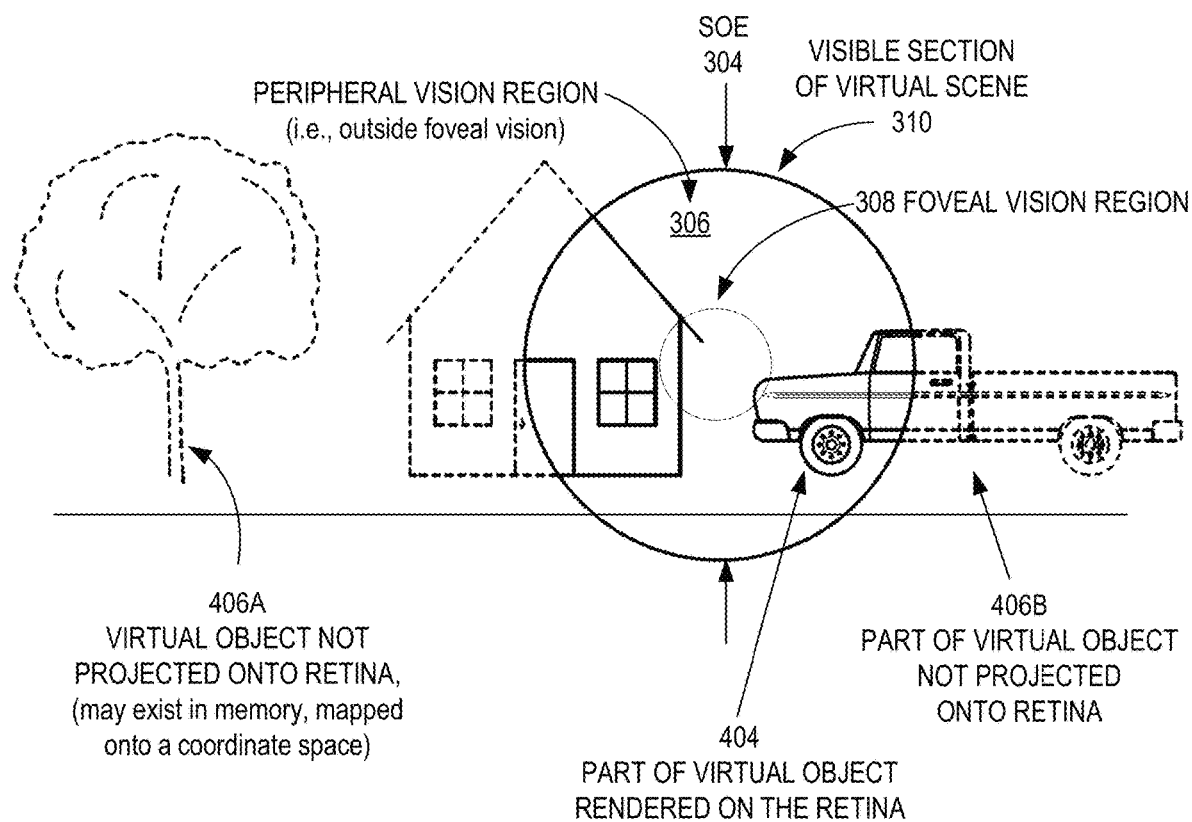

FIG. 4B and FIG. 4C illustrate the concept of SoE by using a flashlight analogy. In certain aspects, the notion of an SoE making visible just a section of the larger virtual scene is analogous to looking at objects in a dark environment (FIG. 4C) illuminated only by a flashlight (FIG. 4B). In both cases, only the portion of the 2D or 3D scene that is "illuminated" by SoE 304 or the conical beam 312 of the flashlight is visible at a given moment. This analogy assumes that a defined circular edge exists around the circumference of the projected flashlight that effectively limits the visible region within the circumference of the flashlight relative to a virtual scene.

Depicted in FIG. 4C is a virtual scene that comprises visible section 310 and invisible sections of virtual scene 406 defined by what is displayed within the SoE 304 at any moment in time. The image displayed in visible section 310 has a circular shape, similar to the projection produced by flashlight 400. As the visibility of items illuminated by shining a flashlight onto them is confined to the illuminated surfaces, an EMD image projector projects images onto a limited (here, circular) visible section 310 corresponding to, for example, a 25-degrees-wide SoE 304. Therefore, as shown in FIG. 4C, visible section 310, which comprises foveal 308 and peripheral 306 vision regions, correspond to the base of a 25 degrees-wide cone in the coordinate space of the virtual scene.

Objects 406A and partial objects 406B in FIG. 4C that do not fall within visible section 310 are not displayed on the retina and, thus remain invisible to the eye until being recalled from computer memory (or derived from stored information) and included within SoE 304 by the image projector that renders the recalled objects onto the retina, in response to the user turning their eye in the direction of those objects. In short, moving the eye and SoE 304 to look around a virtual image or scene bears resemblance to scanning a surface in the dark by illuminating the surface with a flashlight. Accordingly, the image projector effectively updates the SoE 304 relative to eye movements of a user by loading a corresponding portion of the virtual image and updating what is projected onto the eye.

It is noted that while images rendered onto the retina are depicted as being circular in FIGS. 4A-4C, this is not intended as a limitation on the scope of the present disclosure, since any shapes, such as ellipsoids, rectangles, hexagons, or any arbitrary shapes, may equally be used.

Unlike an actual flashlight that allows eyes to inspect (i.e., move toward or look at) any part of the illuminated area, including objects that are located at or near the edges of the illuminated area, the concept of the SoE does not allow the wearer of an EMD to inspect or move the eye to directly look at the edge of visible section 310 to view off-center regions 306 of visible section 310 that are projected outside of foveal vision region 308. In embodiments, in response to detecting an attempt to inspect an object or image that is displayed at the edge of visible section 310, a displayed object may be re-rendered, such as to move from the edge, the users' peripheral vision region 306, to the user's foveal vision region 308 to enable the user to inspect objects anywhere in a virtual scene, including objects originally located outside of foveal vision region 308.

F. Glance and Reveal Operations Using Triggers and Sub-Elements

Figure 5:
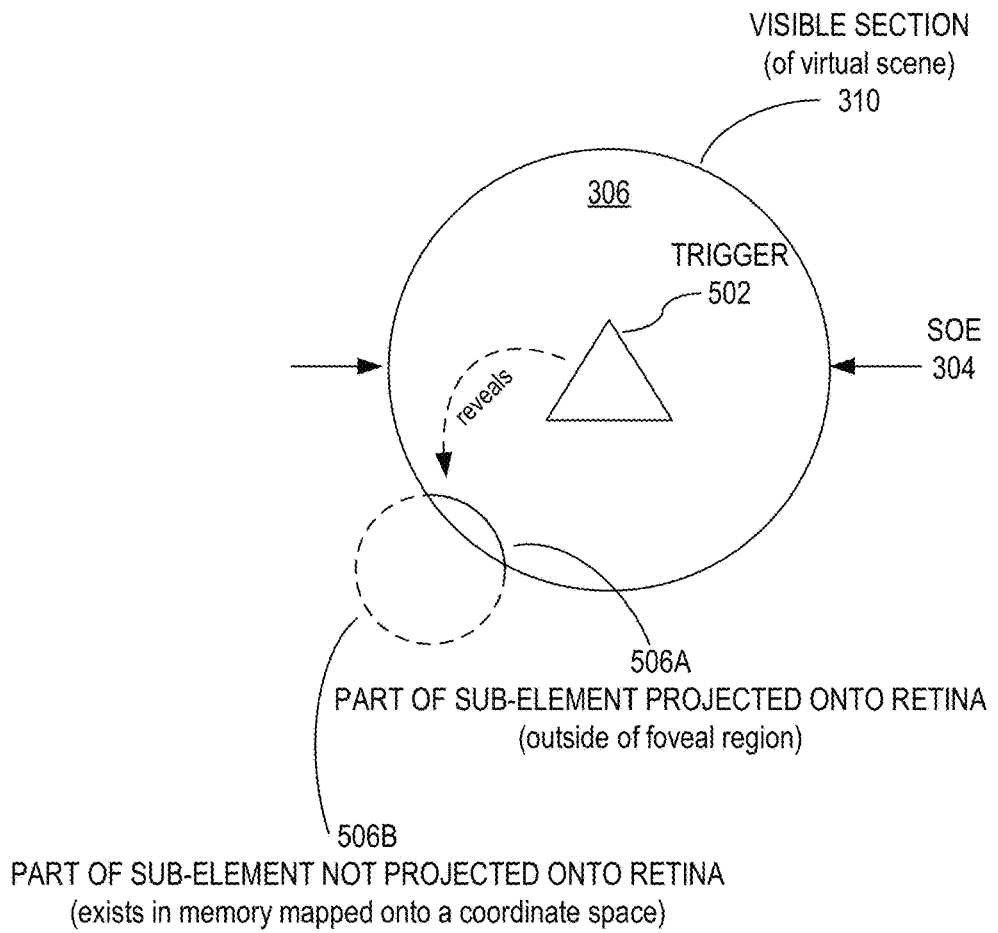
FIG. 5 illustrates revealing nearby virtual objects using a trigger in the visible section of a virtual scene according to embodiments of the present disclosure.

FIG. 5 illustrates revealing nearby virtual objects using a trigger in the visible section of a virtual scene according to embodiments of the present disclosure. It is noted that trigger 502 represents any virtual object, such as an element, content (e.g., static or dynamic text alphanumeric character, image, icon, or any arbitrary symbol), or a tool, e.g., a tool to navigate various levels of a hierarchical structure, or a region in the vicinity of such virtual object. A sub-element 506 revealed by trigger element 502 may itself be or become a trigger element for another sub-element (not shown in FIG. 5).

In embodiments, visible section 310 comprises trigger 502 that may be invoked by being looked at (i.e., eye-selected either directly or indirectly, e.g., by looking or glancing at a location at or near trigger 502), or by being identified as a target location of an eye movement, or simply by being highlighted in response to falling within visible section 310. In embodiments, trigger 502 may be invoked by saccadic eye motions in the direction of trigger 502, before the eye's gaze has reached the trigger, and which are destined to land on or near the trigger or in its direction, as may be determined by using mathematical saccade prediction. Trigger 502 may further be invoked by a user performing a sequence of eye movements and pauses, also known as an eye gesture. Once trigger 502 is invoked, it may initiate a number of actions that result in the trigger 502, for example, (1) becoming selectable; (2) being selected; (3) revealing a virtual object, such as sub-element 506 (here, a partially visible object that appears in the peripheral vision region of SoE 304), or the presence thereof (here, the visible part of sub-element 506 provides a clue or hint as to its presence, such that it can be selected/activated and, e.g., moved to the foveal vision region); (4) partially or fully displaying virtual objects in the visible area; (5) adding objects to the virtual environment outside of the visible area; and/or (6) selecting one or more virtual objects. It is noted that invoking trigger 502 may have other and additional effects, such as removing elements from the virtual scene, updating or replacing elements, invoking any type of action, or any combinations thereof.

Selecting a particular object, such as trigger 502, may enable any number of possible subsequent selections and determine the type and manner of such selection, e.g., according to a hierarchy of selectable objects or indicators. In embodiments, invoking a selection may be accompanied by a feedback mechanism that may comprise any combination of temporary visual, auditory, haptic, or other type of feedback. The feedback mechanism may comprise altering the characteristics or the appearance (color, shape, size, depth, etc.) of the selected item and/or any item associated therewith. For example, the selection of a particular indicator or virtual object may further animate the object by highlighting it, which may comprise visibly changing the appearance of the object in a manner such as to distinguish it from other virtual or real-world objects. As will be discussed in greater detail below, a selection may also result in moving a virtual object to or near the center or the edges of a visible location or pathway. In addition, selecting may comprise changing the size of a selectable object or alternating between appearances. In embodiments, virtual objects may be placed or re-arranged at locations close to each other, e.g., in response a selection, to support rapid navigation and reduce eye travel time and reduce long-distance eye movements to prevent premature fatigue and increase eye-tracking accuracy.

It is noted that embodiments presented herein may equally be used non-EMD systems, such as AR, VR, MR, and XR displays, in related applications to enable a clutter-free, naturally flowing, and user-friendly navigation.

G. Glance and Reveal Operations Using Connectors and Pointers

Figures 6A, 6B:
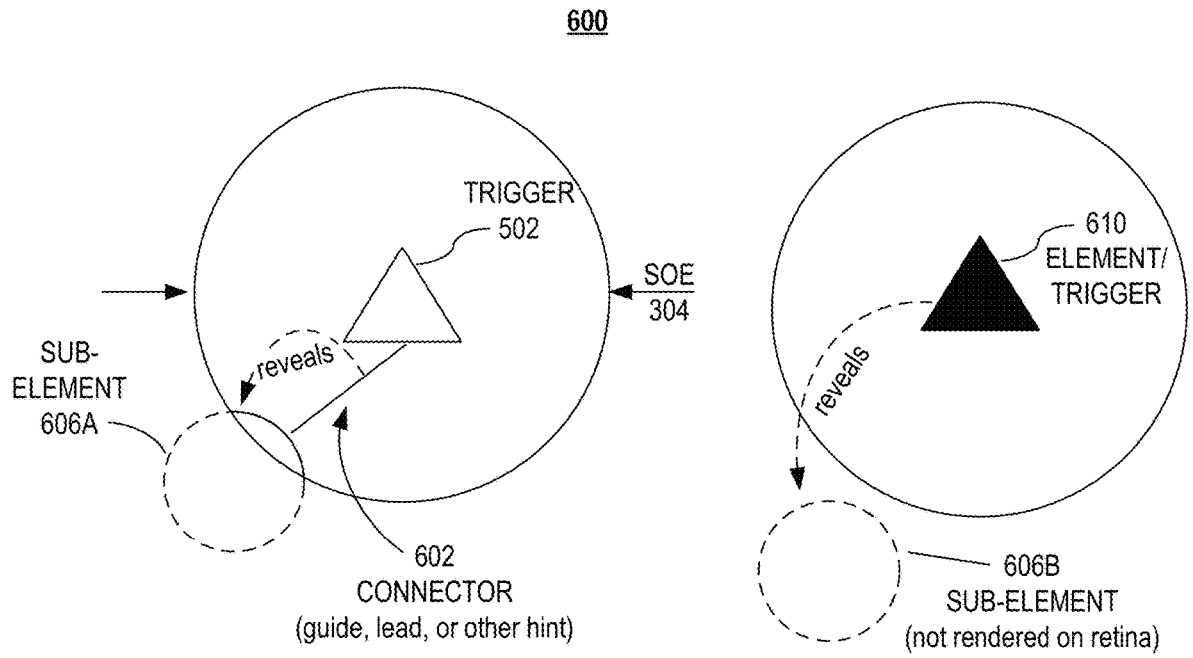
FIG. 6A illustrates a virtual object that utilizes a connector according to embodiments of the present disclosure.
FIG. 6B illustrates a virtual object that, without utilizing a visible connector, reveals the presence of an otherwise not visible virtual object according to embodiments of the present disclosure.

FIG. 6A illustrates a virtual object that utilizes a connector according to embodiments of the present disclosure. As depicted, a trigger 502 comprises connector 602 that is visibly connected to another virtual object such as sub-element 606A. In embodiments, connector 602 may serve as a guide, lead, or clue that implies, signals, or reveals the location and/or presence of sub-element 606A. Connector 602 may be visible in conjunction with trigger 502, or it may become visible once trigger 502 has been invoked, such that connector 602 is included into the virtual scene in conjunction with sub-element 606A. In embodiments, sub-element 606A may be a selectable object that is partially or fully located outside of SoE 304 and may be only partially visible, or not visible to the observer at the moment of invocation. It is understood that the connector 602 itself may also be invocable to initiate an action or a series of actions, such as those mentioned with reference to FIG. 5. It is further understood that any number of virtual objects may be arranged to spatially overlap with each other.

FIG. 6B illustrates a virtual object that, without utilizing a visible connector, reveals the presence of an otherwise not visible virtual object according to embodiments of the present disclosure. A trigger or element 610 in FIG. 6B may be a section indicator such as a word that can be selected by looking at it, and that comprises no connector, proxy, or pointer. In embodiments, the presence of trigger/element 610 itself may serve as a clue that reveals sub-element 606B that due to its location outside of SoE 304 is not rendered on the retina and is not visible to the eye in FIG. 6B. In embodiments, invoking trigger/element 610 according to any of the methods mentioned herein may be used to add or remove sub-elements (e.g., 606B) in the virtual scene that are outside SoE 304 and, thus, not immediately visible until the observer gazes in that direction to render the sub-element 606B into SoE 304.

Figures 6C, 6D:
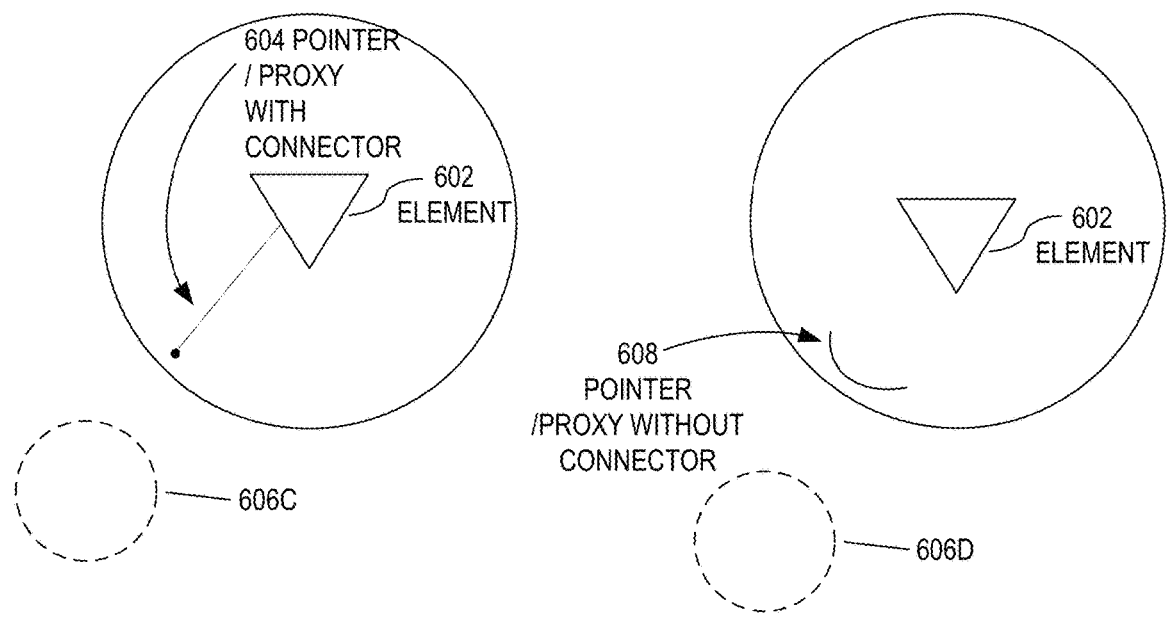
FIG. 6C illustrates a proxy or pointer with a connector according to embodiments of the present disclosure.
FIG. 6D illustrates a proxy or pointer without a connector according to embodiments of the present disclosure.

FIG. 6C illustrates a proxy or pointer with a connector according to embodiments of the present disclosure. As depicted in FIG. 6C proxy/pointer 604 comprises a dot that is displayed as a filled circle. It is noted, however, that any mark or symbol, or location near such symbol, may be employed as a proxy/pointer. In embodiments, proxy/pointer 604 draws the user's attention to the presence of sub-element 606C and provides the user's eye a place to saccade to, for example, by being positioned such as to indicate the direction of sub-element 606C located outside of the visible area. In embodiments, once proxy/pointer 604 has been invoked, proxy/pointer 604 itself may serve as a trigger element.

FIG. 6D illustrates a proxy or pointer without a connector according to embodiments of the present disclosure. A wearer who is reasonably familiar with a spatial relationship between two or more virtual objects or who anticipates such spatial relationship(s) may imply from the existence of element 602 the presence and/or location of a nearby sub-element 606D despite its absence from the visible region, for example, from the presence of proxy/pointer 608 that need not be connected with element 602. As with the proxy/pointer in FIG. 6C, once trigger/element 610 activates sub-element 606D, proxy/pointer 608 in FIG. 6D may draw a user's attention to the presence of sub-element 606D located outside of the visible area. In embodiments, as depicted in FIG. 6D, proxy/pointer 608 may be placed near the edge of the visible area and in direction of sub-element 606D to indicate direction of sub-element 606D. In embodiments, in response to detecting a user's attempts to look at or toward proxy/pointer 608 or sub-element 606D, proxy/pointer 608 may "move" or point in the direction of sub-element 606D, i.e., closer to the edge of the visible area, for example, until sub-element 606D is revealed or partially revealed. In embodiments, once the user saccades to proxy/pointer 608, proxy/pointer 608 may jump/move again to the edge, i.e., closer to sub-element 606D.

Figure 6E:
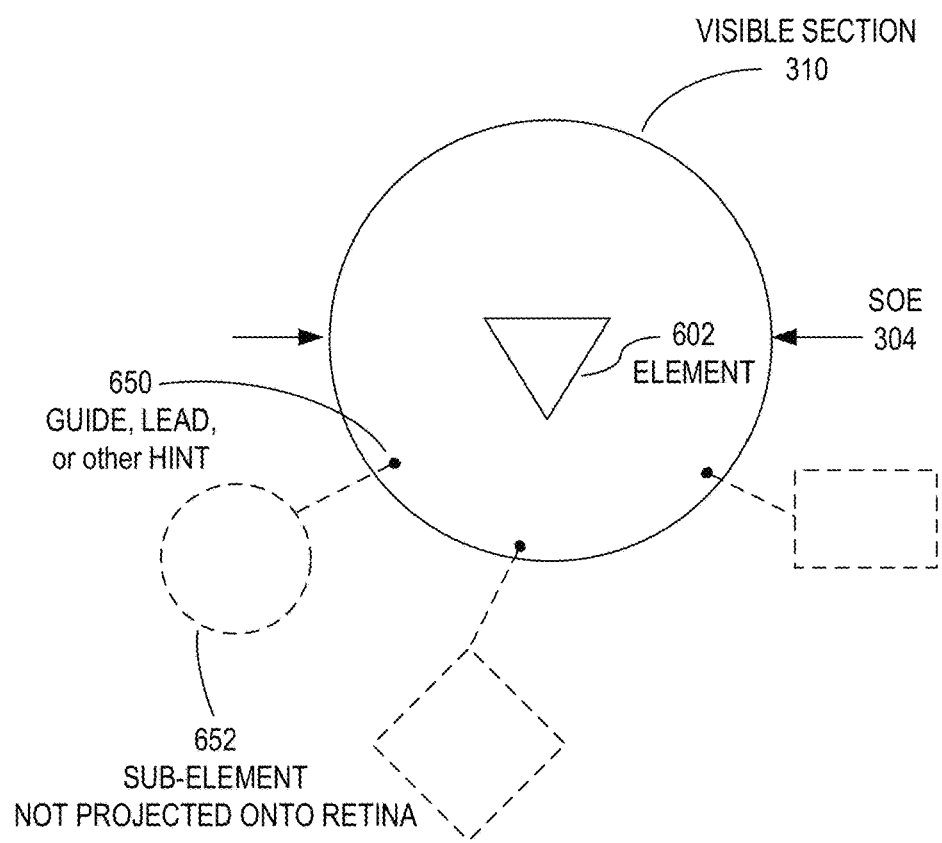
FIG. 6E illustrates items that serve as hints for the presence of non-visible objects according to embodiments of the present disclosure.

FIG. 6E illustrates items that serve as hints for the presence of non-visible objects according to embodiments of the present disclosure. In embodiments, guide, lead, or hint 650 may serve to guide the wearer's gaze to sub-element 652 without showing or revealing the trigger itself. Guide 650 may be, for example, an intermediate element that the gaze passes when being directed from element 602 to sub-element 652.

It is understood that virtual objects or indicators, such as triggers, elements, and sub-elements, may be arranged within a virtual scene in any desired pattern. For example, virtual objects may be arranged along visible, partly visible, and non-visible paths such as geometric shapes that are easy and intuitive to navigate by eye. In embodiments, virtual objects may be arranged in patterns that make it easier to detect and/or interpret detected eye-motion to distinguish certain eye movements and gaze directions.

H. Arrangement of Virtual Objects in a Virtual Scene

Figure 7:
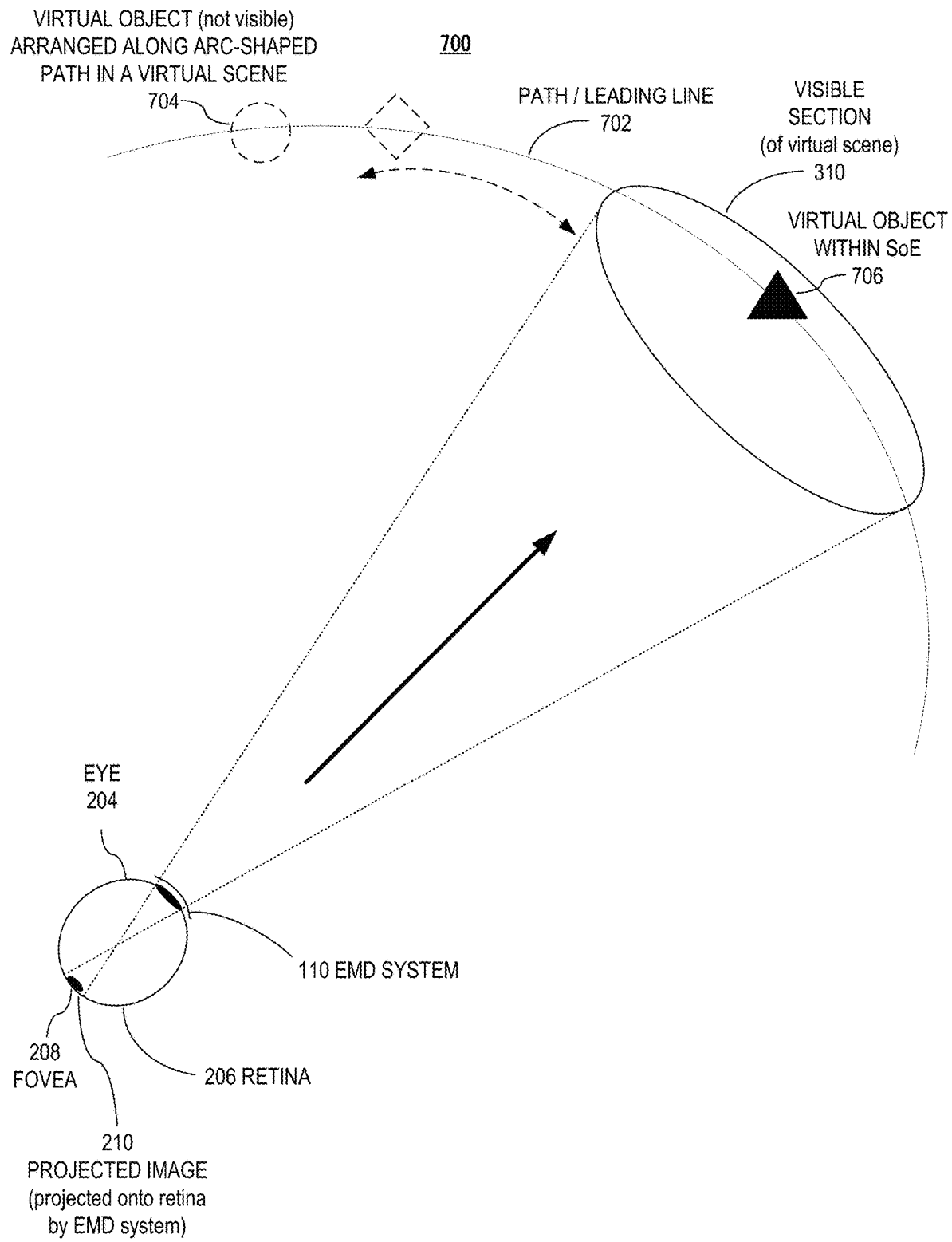
FIG. 7 illustrates an exemplary arrangement of virtual objects in a virtual scene according to embodiments of the present disclosure.

FIG. 7 illustrates an exemplary arrangement of virtual objects in a virtual scene according to embodiments of the present disclosure. As depicted, virtual objects (e.g., 704) may be arranged along visible or partially visible paths/leading line 702, which in FIG. 7 resembles the shape of arc that, in embodiments, leads the user's attention from one object to another. The content of virtual scene 700 may be mapped flat onto a virtual plane, curved to the inside of a cylinder or sphere, or arranged in any other format in two or three dimensions.

When a wearer looks at virtual object 706 located within SoE 310, this glance causes image 210 to be rendered onto retina 206. In embodiments, once the wearer moves eye 204 to look away from virtual object 706 toward a region located outside of visible region 310, the projected image 210 may be re-rendered along path/leading line 702. This re-rending effectively updates the projected image to move visible region 310 toward other virtual objects 704 in virtual scene 700.

In embodiments, path/leading line 702 may be mapped onto a suitable coordinate system and referenced to one or more frames of reference, such as the wearer's body, surroundings, etc., as previously discussed with reference to FIG. 2B-FIG. 2D. By using the user's head as a frame of reference, object 706 appears in visible section 310 of the user's field of vision regardless of where the user's head is turned. In embodiments, this allows the user to scan scene 700 by moving his/her eye 204 within the user's range of eye motion. Because scene 700 is locked to and moves with the user's head, it is available wherever the user is facing.

I. Glancing at and Revealing Virtual Objects in a Virtual Scene

Figure 8A:
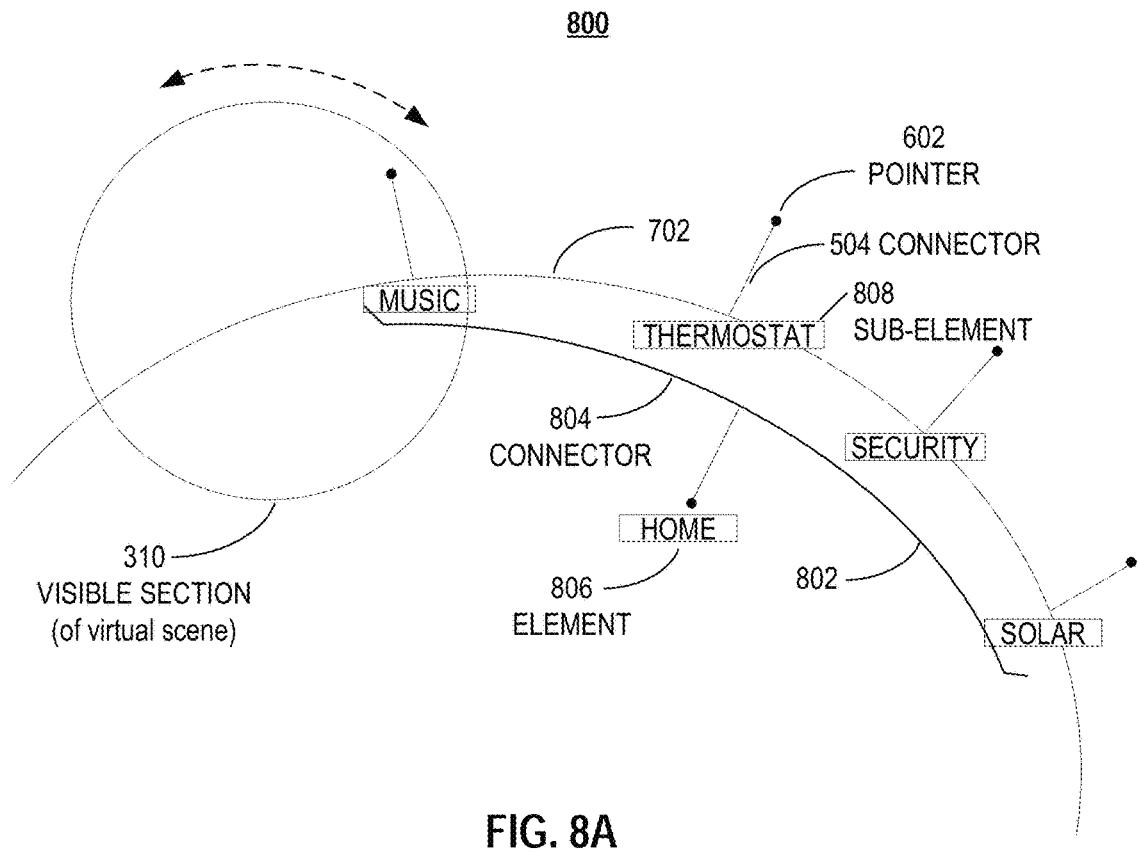
FIG. 8A and FIG. 8B illustrate a method for using a wearer's gaze to reveal objects in an exemplary virtual scene according to embodiments of the present disclosure.
Figure 8B:
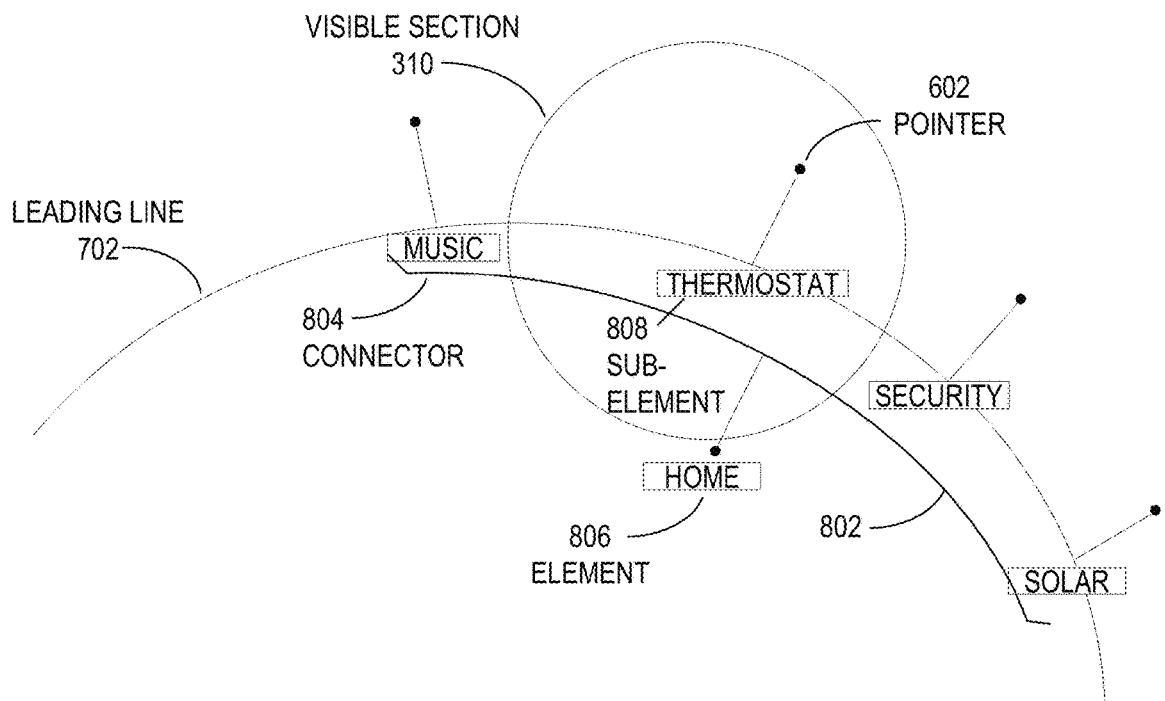

FIG. 8A and FIG. 8B illustrate a method for using a user's gaze to reveal objects in an exemplary virtual scene according to embodiments of the present disclosure. Depicted is a two-dimensional arrangement of virtual objects in virtual scene 800 that comprises multi-level hierarchical navigation tools. In FIG. 8A and FIG. 8B, two hierarchy levels are represented by element 806 (labeled home) and sub-elements 808 (labeled music, thermostat, security and solar) that are displayed as words arranged along leading line 702 to lead the user's attention from one sub-element 808 to another.

The arrangement of element 806 and sub-elements 808 in FIG. 8A and FIG. 8B is chosen such that a set of words representing sub-elements 808 of element 806 (home) is separated by connector 804. Sub-elements 808 appear on one side of connector 804 and opposite to element 806. In embodiments, connector 804 between virtual objects guides the user's gaze in the coordinate space of virtual scene 800. In embodiments, as the user's gaze moves, the content of visible section 310 is controlled, in concert with the user's eye motion, to smoothly transition and display different sections of virtual scene 800. This way, the user has the experience of "looking around" in virtual scene 800.

In embodiments, element 806 may be used as a navigation tool that, once invoked by one or more of the methods previously mentioned, reveals sub-element 808. Sub-element 808, in turn, may reveal other levels of hierarchy (not shown), thereby, facilitating the navigation of a multi-level hierarchy, advantageously, without the need for employing external or auxiliary selection devices. In embodiments, by invoking element 806 in any of the mentioned ways, a user may reveal pointer 602 connected to sub-element 808, such that by glancing at pointer 602, the user can activate sub-element 808 and cause visible section 310 to move along leading line 702, until sub-element 808 is within visible section 310.

It is noted that this embodiment visually separates two levels of hierarchy. However, this is not intended as a limitation on the scope of the present disclosure. The user's gaze may be directed in any other way, which may or may not include a logical or spatial grouping of elements and sub-elements.

Figure 9:
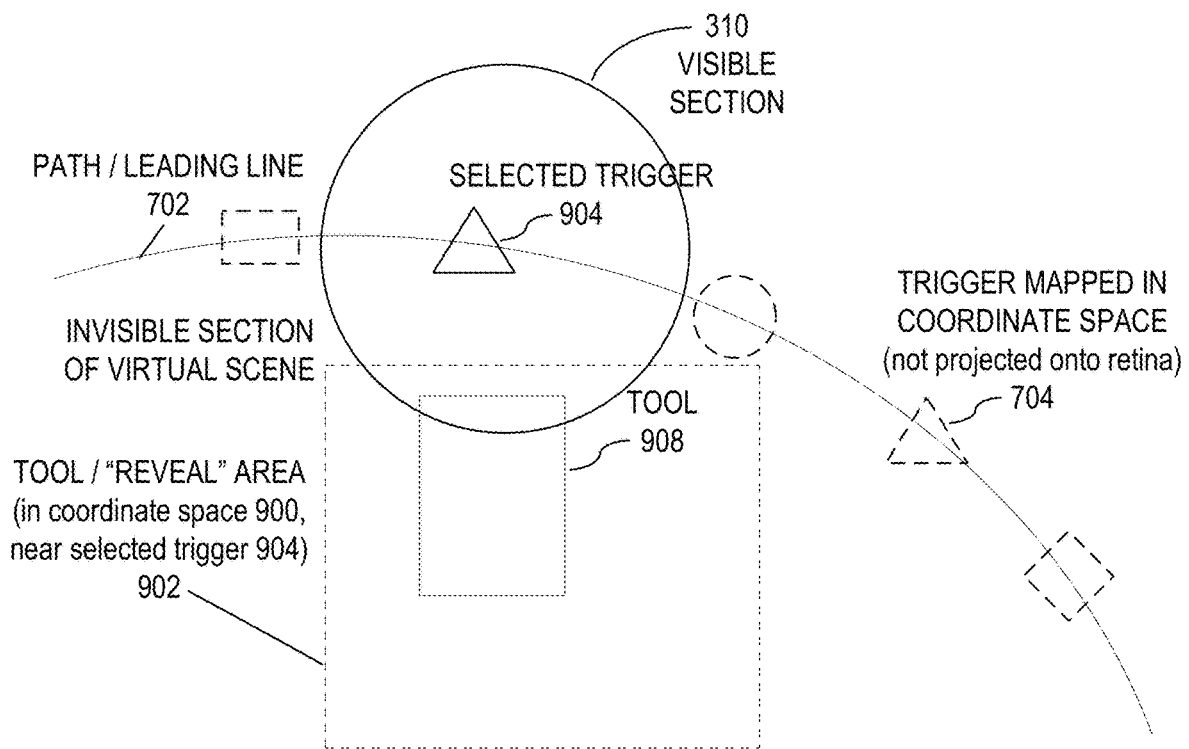
FIG. 9 illustrates a method for revealing virtual objects in a virtual space according to embodiments of the present disclosure.

FIG. 9 illustrates a method for revealing virtual objects in a virtual space according to embodiments of the present disclosure. Once trigger 904 is invoked element in any of the aforementioned ways, tool 908 may appear in a common tool or reveal area 902 in virtual scene 900.

Figure 10A:
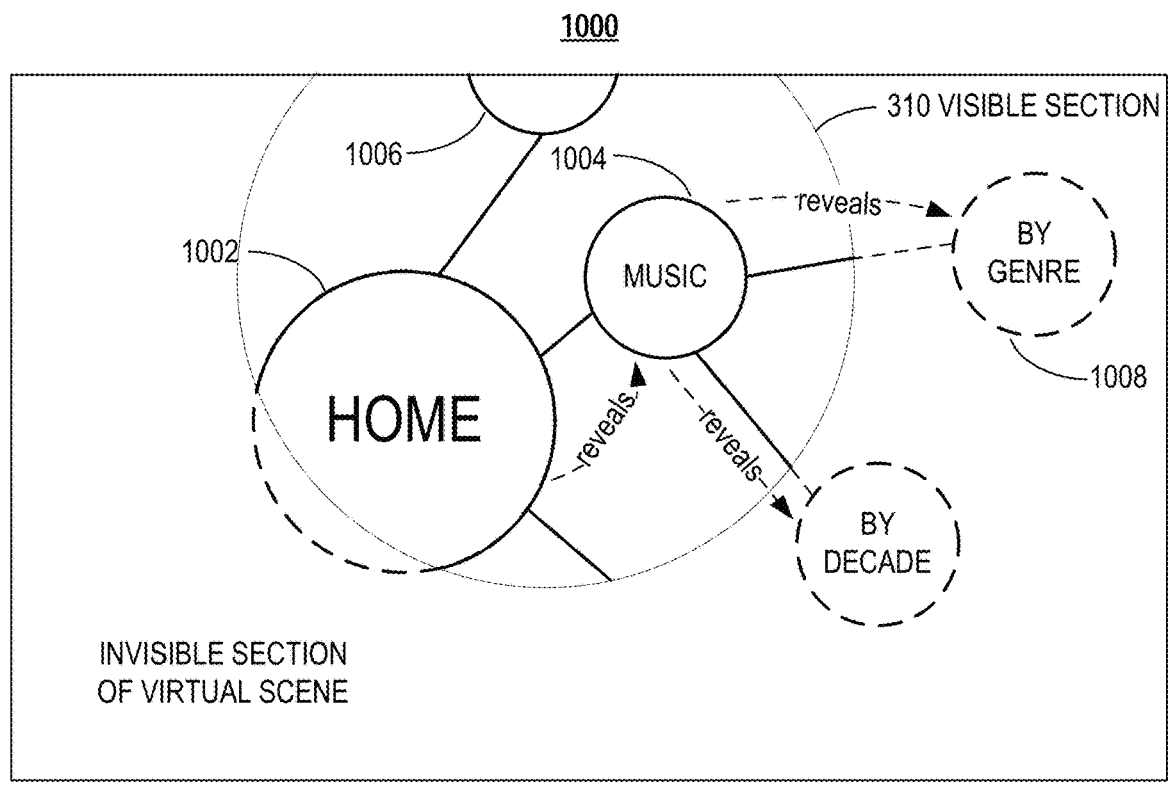
FIG. 10A and FIG. 10B illustrate a method for visually navigating virtual objects according to embodiments of the present disclosure.
Figure 10B:
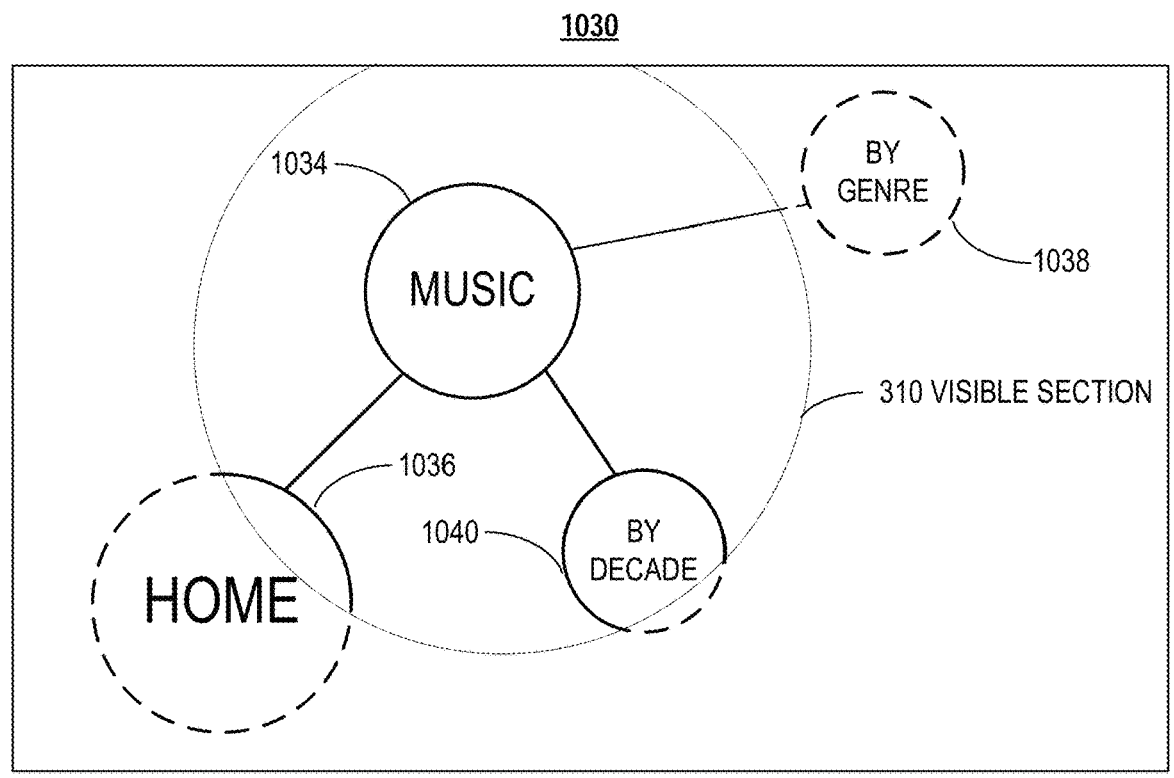

FIG. 10A and FIG. 10B illustrate a method for visually navigating virtual objects according to embodiments of the present disclosure. FIG. 10A shows element 1002 and sub-elements (e.g., 1004), which are observable within visible section 310, and sub-elements (e.g., 1008), which are outside of visible section 310. In embodiments, virtual objects, such as element 1002 and sub-element 1004, may appear and slide and in and out of visible section 310 or virtual scene 1000, 1030 in response to a gaze direction being determined. The virtual objects in scene 1000, 1030 may signal their presence and availability via their connectors and by floating, moving, and/or changing their appearance.

In embodiments, the movement of virtual objects may aid in visual navigation by guiding the eye to an object and/or revealing one or more underlying or additional objects in virtual scene 1000. For example, element 1002 in visible section 310 may reveal the presence of sub-element 1004 to which element 1002 is coupled via a connector. The connector between sub-elements 1004 and 1008, in turn, may reveal the presence of a sub-element 1008, which, according to FIG. 10A, is invisible to the eye due to its location outside of visible section 310, i.e., outside of the user's SoE.

Invoking an object may cause that object to move towards the center of visible section 310 or any location in the virtual scene where content may be viewed more comfortably, as predicted or calculated by a controller. In embodiments, objects' movements may facilitate a smooth flow and create an intuitive transition without requiring long-distance saccades by the eye and without requiring the head to turn to ever increasing angles to reach. Advantageously, having the interaction happen in a defined area in virtual scene 1000, 1030 also permits comfortable navigation of deeper hierarchies. Once sub-element 1004 is invoked, as shown in virtual scene 1030, sub-element 1004 itself may transform into a trigger element that reveals sub-elements 1038 and 1040.

Figure 11:
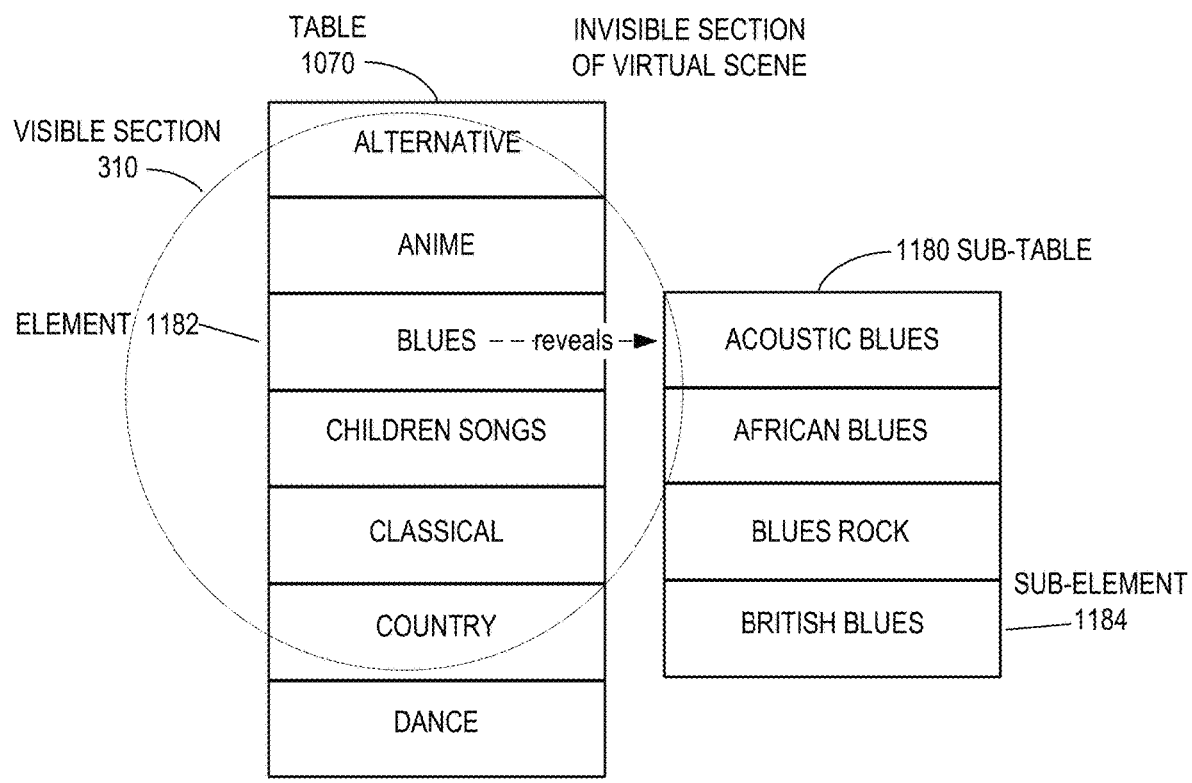
FIG. 11 illustrates another method for visually navigating virtual information according to embodiments of the present disclosure.

FIG. 11 illustrates another method for visually navigating virtual information according to embodiments of the present disclosure. FIG. 11 shows elements 1182 and sub-elements 1184 that are arranged in a tabular format as entries in tables 1070 and sub-table 1180. Visible section 310 displays a portion of elements 1182 in table 1070. In embodiments, elements 1182 once invoked, e.g., by being looked at, reveal the presence of a next level of hierarchy that is not visible or only partially visible within visible section 310. Once the next level of hierarchy is invoked, it may be displayed in the form of sub-tables (e.g., 1180) that comprise sub-elements 1184.

As an example, once element 1182 "Blues" in table 1070 is invoked, e.g., in response to detecting that the user looks at that element, the next level hierarchy table, sub-table 1180 and its sub-elements 1184 may be activated and become (partially) visible in visible section 310. If a different trigger element in table 1070 is subsequently invoked, such as "Children Songs," sub-table 1180 may be removed, updated, or otherwise replaced with a different sub-table or content comprising sub-elements associated with that different trigger element. It is understood that the transition to a different content or (sub-)table may involve any number of ways of animating this change. In embodiments, virtual scene 1100 may comprise any navigation tool known in the art that is suitable for selection by eye, such as a grid, a tree, a matrix, a checklist, etc., that may be positioned anywhere within virtual scene 1100. A person of skill in the art will appreciate that, in embodiments, a virtual object may visually indicate the completion of a selection process, a hierarchy, etc.

In embodiments, in alternative applications such as VR, the user may be presented with an entire list of categories that is not limited to the SoE, i.e., visible section 310, such that in response to detecting that the user looks at element 1182, sub-table 1180 may be automatically activated/displayed in virtual scene 1100. In embodiments, in response to detecting that the user looks at element 1182, element 1182 may be highlighted and a connector or a proxy/pointer with a connector, such as those discussed, e.g., with reference to FIG. 6C and FIG. 7, may be automatically displayed and serve as a trigger for or leading line to sub-table 1180. Invoking sub-table 1180, e.g., by looking at the proxy/pointer, may cause sub-table 1180 to move towards a location in virtual scene 1100 where it may be more comfortably viewed, again, facilitating a smooth flow and creating an intuitive transition that significantly reduces eye/head motion when compared with existing AR, VR, and other systems. In embodiments, to reduce clutter, a lower level hierarchy may remain at least partially invisible until the user unlocks that hierarchy level by looking at a certain trigger element associated with a higher level hierarchy. It is understood that any features of existing systems, such as inertial measurement units built-in to an existing system, may be utilized to accomplish the goal of the present disclosure.

In embodiments, a virtual object, such as element 1182, may serve as a trigger that may reveal objects by populating sub-table 1180. A sub-element 1184 in sub-table 1180 may, in turn, expand to reveal additional virtual objects, such as a sub-element that comprises textual content (not shown) related to sub-element 1184. In embodiments, table 1070 and sub-table 1180 may move in a manner such as to cause subsequent levels of hierarchy to remain in a defined area, e.g., to reduce eye or neck motion.

In embodiments, this may be accomplished by detecting how much the user has twisted their neck. For example, an angle, such as a user's head angle, or a distance may be detected between a staring location where an interaction has commenced and a target location where certain content is located (or headed to) and, if the angle or distance meets a threshold, an object may start to shift back towards the staring location. In embodiments, such movement back to a starting location, or anywhere else in visible section 310, may be made dependent on the angle or distance, such that the greater the angle or distance, the faster the movement may be made.

In embodiments, instead of shifting content, virtual objects in virtual scene 1100 may be displayed in a manner such as to appear stationary in space, such as to enable a "wide display," that permits the user to look at virtual objects in virtual scene 1100 by turning their head and/or body. This affords the user a sense of space and a large workspace. Useful if you don't care about your head motions being discreet.

J. System Implementation

Figure 12:
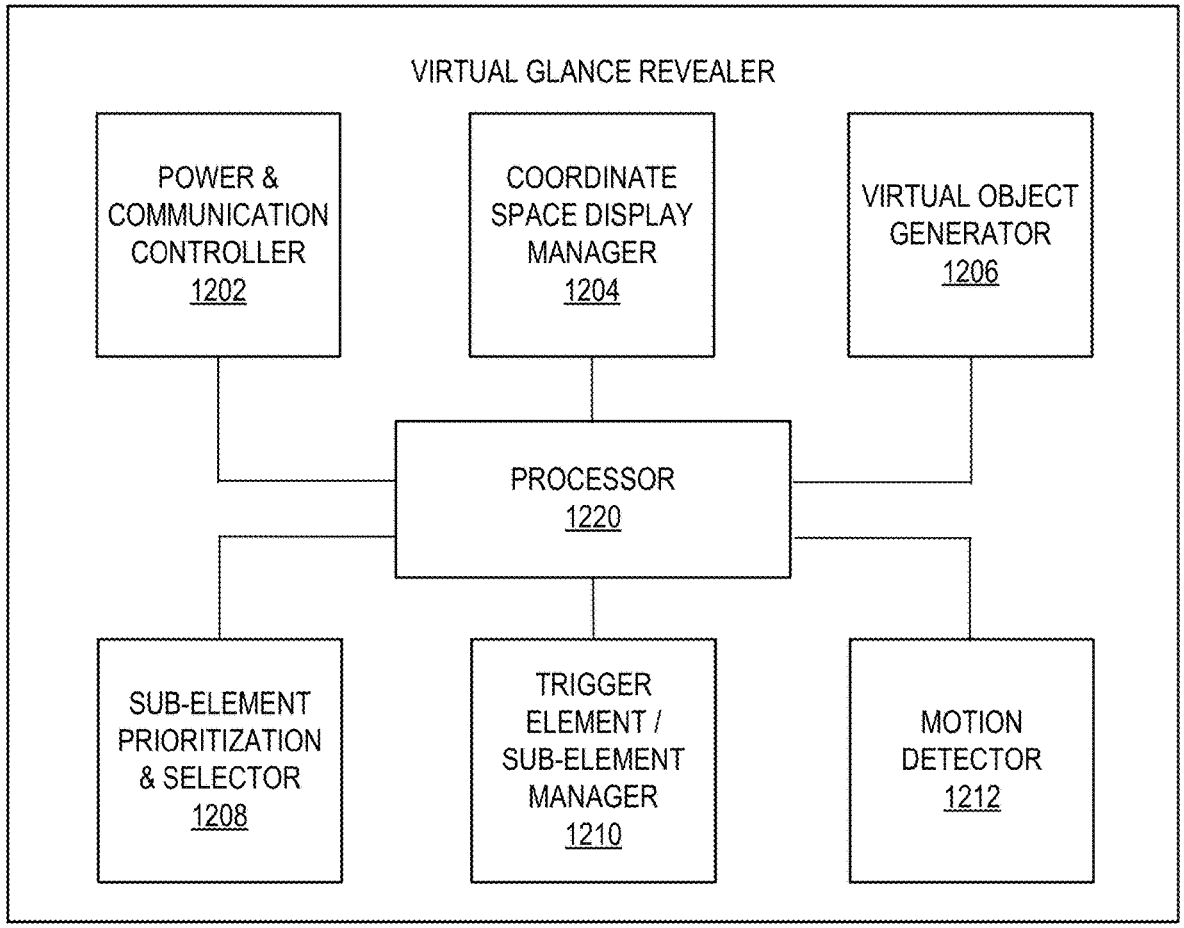
FIG. 12 illustrates a virtual glance revealer for navigating virtual objects according to embodiments of the present disclosure.

FIG. 12 illustrates a virtual glance revealer for navigating virtual objects according to embodiments of the present disclosure. In embodiments, virtual glance revealer 1200 comprises processor(s) 1220 that are communicatively coupled to and coordinate functions of individual modules of virtual glance revealer 1200. These other modules may include power and communication controller 1202, coordinate space display manager 1204, virtual object generator 1206, sub-element prioritization and selector 1208, trigger element/sub-element manager 1210, and motion detector 1212. It is understood that any part of virtual glance revealer 1200 may be implemented on a contact lens and/or an accessory device that communicates with an EMD system according to embodiments presented herein.

In operation, power and communication controller 1202 may aid in distribution, harvesting, monitoring, and control of power to facilitate operation of virtual glance revealer 1220, including internal and external communication of data and control commands between components and sub-components of a virtual glance revealer system. In embodiments, coordinate space display manager 1204 may define a virtual space according to a coordinate system as shown in FIG. 2B to map virtual objects onto the virtual space. Coordinate space display manager 1204 may control content and spatial relationships of virtual objects within the coordinate system that is fixed in one or more degrees of freedom with respect to at least one real-world object, such as a user's headgear, or with respect to gravity and earth magnetic field. In embodiments, coordinate space display manager 1204 may be communicatively coupled to a display controller that may determine what images the display optics renders on the user's retina.

Virtual object generator 1206 controls the generation, appearance, and location of virtual objects within sections of the virtual space that are visible to the user's eye. Location and appearance information for one or more virtual objects, such as elements, sub-elements, and triggers may be provided based on a decision by sub-element prioritization and selector module 1208 that determines which virtual objects to reveal. These revealed virtual objects may be selected in response to data input from motion detector 1212 that may be used to distinguish between a user action such an eye-movement, a selection of an element by eye or a head motion.

Sub-element prioritization and selector module 1208 defines the appearance of one or more navigation tools by selecting the type(s) of information to be displayed based on the user action. In embodiments, the selection of elements may be facilitated by trigger element/sub-element manager by revealing or concealing the presence of virtual objects according to embodiments presented herein. Any number of components of virtual glance revealer 1220 may utilize data input from motion detector 1212 that comprises motion and other sensors according to embodiments presented herein.

Figure 13:
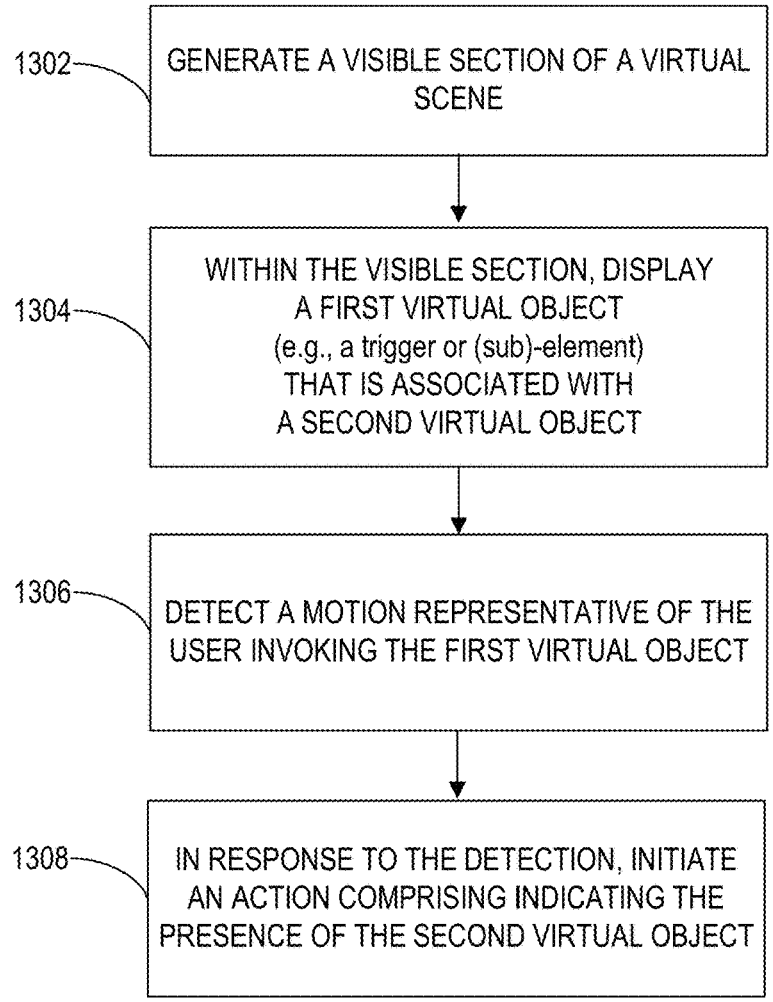
FIG. 13 illustrates a process for using a virtual glance revealer system to navigate virtual tools according to embodiments of the present disclosure.

FIG. 13 illustrates a process for using a virtual glance revealer system to navigate virtual tools according to embodiments of the present disclosure. Process 1300 may begin at step 1302 when a virtual scene comprising a visible section, which may appear to be stationary with respect to a reference frame, is generated. A display projects the visible section, which may be defined by an SoE, onto a user's retina.

At step 1304, a first virtual object, such as a trigger or a sub-element that is associated with a second virtual object, is displayed within the visible section.

At step 1306, a motion with respect to a reference frame is detected by measuring, inferring, or anticipating a motion that comprises an eye or head motion or any combination thereof. This motion is representative of the user invoking the trigger or is interpreted as a trigger command as opposed to an unintended or inadvertent motion.

At step 1308, once the motion is detected by detecting a target location based on a start location of a saccade of an eye motion. Before the user directs his gaze to the target location, an action is initiated that indicates the presence of the second virtual object that aids the user to navigate the virtual space. The second virtual object may be invoked in response to the action, i.e., prior to being in the visible section. In embodiments, the action may comprise an action that is used to reduce the likelihood of a false positive detection.

In embodiments, navigating virtual tools may comprise transitioning between reference frames. For example, a first frame of reference may move with the user's head and a second frame of reference may move with the user's body.

A transition may comprise changing an appearance of the content or the navigation tool. In embodiments, in response to the user directing his gaze in a predetermined direction or a predetermined distance or angle away from the content or the navigation tool will result in that content or navigation tool to be deactivated.

In embodiments, looking away from a user-selectable virtual object, such as a sub-element, may cause that object to be deactivated, for example, by changing its appearance by dimming the object or by changing its motion relative to other virtual or real objects. In embodiments, looking away from a group of selectable objects may cause the entire group of selectable objects to be deactivated, for example, depending on the distance of the eye motion or the fixation point of the eyes being located well beyond or well in front of the virtual content.

What is claimed is:

1. An eye-mounted display system comprising:
    a contact lens;
    at least one femtoprojector contained within the contact lens, the at least one femtoprojector projects images onto a user retina;
    at least one motion sensor contained within the contact lens;
    a motion tracker in communication with the at least one motion sensor, the motion tracker determining at least one of a position, an orientation or a velocity of the user's eye in one or more degrees of freedom;
    where,
    a content of the projected images depends upon tracking information generated by the motion tracker; and
    the display system capable of performing steps comprising:
        projecting a visible section of a virtual scene;
        within the visible section, generating a first virtual object associated with a second virtual object;
        detecting a motion representative of the user, when presented with the visible section invoking the first virtual object; and,
        in response to detecting the motion, initiating an action comprising indicating a presence of the second virtual object.

2. The system according to claim 1, wherein the visible section extends over an area of the user retina defined by a span of eccentricity.

3. The system according to claim 1, wherein invoking the first virtual object comprises at least one of looking at or glancing at a location at or near the first virtual object.

4. The system according to claim 1, wherein the first virtual object appears stationary with respect to a reference frame.

5. The system according to claim 1, wherein the first virtual object is one of a trigger element or a sub-element that is user-selectable.

6. The system according to claim 1, wherein indicating the presence of the second virtual object comprises at least partially generating the second virtual object in the visible section.

7. The system according to claim 1, wherein indicating the presence of the second virtual object comprises displaying a mark or symbol that draws the user's attention to the presence of the second virtual object.

8. The system according to claim 7, wherein the mark or symbol comprises at least one of a leading line, a proxy, or a pointer.

9. The system according to claim 8, wherein the mark or symbol comprises a connector.

10. The system according to claim 1, wherein in response to detecting that the user invokes or attempts to invoke the second virtual object, assigning to the second virtual object properties of the first virtual object.

11. The system according to claim 1, further comprising, in response to detecting that the user looks in a predetermined direction, or a predetermined location, distance, or angle away from the second virtual object, deactivating a content associated with the second virtual object.

12. The system according to claim 11, further comprising using vergence to determine how far away the user looks.

13. The system according to claim 12, further comprising, based on the vergence, performing steps comprising re-invoking a prior state.

14. The system according to claim 1, wherein detecting the motion comprises measuring, inferring, or anticipating the motion based on the user's range of eye motion.

15. The system according to claim 1, wherein the motion tracker further determines at least one of a position, an orientation or a velocity of the user's head.

16. The system according to claim 1, wherein detecting the motion comprises predicting a target location from a start location of a saccade of the eye motion.

17. The system according to claim 1, further comprising, in response to detecting the motion, invoking the second virtual object.

18. The system according to claim 17, wherein invoking further comprises initiating a feedback mechanism such that the first virtual object is visually altered.

19. The system according to claim 17, wherein invoking further comprises initiating a transition that moves the second virtual object toward the center of the visible section.

20. The system according to claim 19, wherein the transition comprises switching from a first frame of reference to a second frame of reference.

21. The system according to claim 20, wherein the motion tracker further determines at least one of a position, an orientation or a velocity of the user's head and the first frame of reference moves with the user's head and the second frame of reference moves with the user's body, such that when the user turns his head toward the second virtual object, the second virtual object moves toward the center of the visible section.

22. The system according to claim 21, wherein the transition comprises changing an appearance of the second virtual object or content associated with the second virtual object.

23. The system according to claim 22, wherein changing the appearance comprises enlarging the appearance of the second virtual object.

24. The system according to claim 1, wherein detecting the motion comprises detecting a predetermined motion in one or more degrees of freedom.

25. The system according to claim 1, wherein the second virtual object has a hierarchy level that is different than that of the first virtual object.

26. The system according to claim 1, wherein the first virtual object and the second_virtual object are positioned along a predetermined path in the virtual scene.

27. The system according to claim 26, wherein the predetermined path is at least partially visible.

28. The system according to claim 1, wherein the motion tracker is embedded in the contact lens.

29. The system according to claim 1, further comprising a communication circuit to communicate with an auxiliary device by using a wireless signal.

* * * * *